(12) United States Patent
Badam et al.

(10) Patent No.: US 12,430,227 B1
(45) Date of Patent: Sep. 30, 2025

(54) AI-BASED SYSTEM AND METHOD FOR AUTOMATED API DISCOVERY AND ACTION WORKFLOW GENERATION

(71) Applicant: Adopt AI Inc., San Jose, CA (US)

(72) Inventors: Anirudh Badam, Issaquah, WA (US); Vijay Sagar Gullapalli, Campbell, CA (US); Gajanan Vishnu Sabhahit, San Jose, CA (US); Pratyush Kumar Behera, San Jose, CA (US); Arul Manikandan, San Jose, CA (US); Edward Chu, Maple (CA); Deepak Anchala, San Jose, CA (US); Rahul Bhattacharya, San Jose, CA (US)

(73) Assignee: ADOPT AI INC., San Jose, CA (US)

( * ) Notice: Subject to any disclaimer, the term of this patent is extended or adjusted under 35 U.S.C. 154(b) by 0 days.

(21) Appl. No.: 19/175,972

(22) Filed: Apr. 10, 2025

(51) Int. Cl.
  *G06F 11/3604* (2025.01)
  *G06F 9/54* (2006.01)

(52) U.S. Cl.
  CPC .......... *G06F 11/3608* (2013.01); *G06F 9/547* (2013.01)

(58) Field of Classification Search
  CPC .......................... G06F 9/547; G06F 11/3608
  See application file for complete search history.

(56) References Cited

U.S. PATENT DOCUMENTS

| | | | |
|---|---|---|---|
| 2014/0208296 A1* | 7/2014 | Dang | G06F 8/751 717/123 |
| 2019/0034199 A1* | 1/2019 | Pollock | G06F 8/73 |
| 2019/0037005 A1 | 1/2019 | Palladino et al. | |

(Continued)

FOREIGN PATENT DOCUMENTS

| | | |
|---|---|---|
| CN | 117544423 A | 2/2024 |

OTHER PUBLICATIONS

Davide Fucci et al., "On using machine learning to identify knowledge in API reference documentation," 2019 [retrieved Jul. 30, 2025], Library Package for Article: On Using Machine Learning to Identify Knowledge in API Reference Documentation, pp. 109-119, downloaded from <url>:https://dl.acm.org. (Year: 2019).*
Shujun Wang et al., "gDoc: Automatic Generation of Structured API Documentation," 2023 [retrieved Jul. 30, 2025], WWW '23 Companion: Companion Proceedings of the ACM Web Conference 2023, pp. 53-56, downloaded from <url>:https://dl.acm.org. (Year: 2023).*

(Continued)

*Primary Examiner* — S. Sough
*Assistant Examiner* — Stephen D Berman
(74) *Attorney, Agent, or Firm* — Jaseon A. Smith; Shumaker, Loop & Kendrick, LLP

(57) ABSTRACT

A system and a method for automatically discovering and managing actions in an application is disclosed. The system includes a data ingestion layer for receiving application data from multiple sources, a scanning and systematic traversal engine for interacting with UI elements and capturing network calls, an action mapping and generation module for correlating UI actions with API calls and categorizing actions, an AI-driven icon and description generator for creating visual representations and textual descriptions of actions, a user interface for displaying and modifying discovered actions, and a continuous monitoring component for triggering re-scanning based on coverage metrics, error detection, or version updates. The system employs synthetic data generation and AI-driven exploration to uncover hidden or undocumented APIs, enabling comprehensive mapping of an application's capabilities at the API level.

18 Claims, 9 Drawing Sheets

(56) References Cited

U.S. PATENT DOCUMENTS

| | | |
|---|---|---|
| 2019/0213057 A1 | 7/2019 | Nitta |
| 2019/0384617 A1* | 12/2019 | Jain .................. G06F 9/547 |
| 2020/0301674 A1 | 9/2020 | Swope et al. |
| 2020/0364044 A1* | 11/2020 | Bahrami ................ G06F 8/73 |
| 2022/0066847 A1 | 3/2022 | Liu et al. |
| 2023/0093304 A1* | 3/2023 | Brasburg ............ G06F 9/541 |
| | | 717/120 |
| 2023/0131355 A1* | 4/2023 | Sweary .............. G06F 16/213 |
| | | 709/217 |
| 2024/0080367 A1 | 3/2024 | McLellan |
| 2024/0296078 A1* | 9/2024 | Kanvar .................. G06F 9/54 |
| 2025/0208929 A1* | 6/2025 | Hursh .................. G06F 9/541 |

OTHER PUBLICATIONS

Prakhar Dhyani et al., "Automated API Docs Generator using Generative AI," 2024 [retrieved Jul. 30, 2025], IEEE International Students' Conference on Electrical, Electronics and Computer Science, pp. 1-6, downloaded from <url>:https://ieeexplore.ieee.org. (Year: 2024).*

Zhen et al., "FlowMind: automatic workflow generation with LLMs", In Proceedings of the Fourth ACM International Conference on AI in Finance. 2023 (pp. 73-81).

Güler et al., "A Systematic Mapping Study on APIs Utilizing Artificial Intelligence Technology", Degree Project in Technology, First Cycle, 15 Credits, Stockholm, Sweden. 2021 (75 pages).

* cited by examiner

AI-BASED SYSTEM AND METHOD FOR AUTOMATED API DISCOVERY AND ACTION WORKFLOW GENERATION

PRIORITY DETAILS

The present application does not claim priority from any other applications.

FIELD OF INVENTION

The present disclosure relates to software automation and application analysis, and more particularly to a system and method for automatically discovering and managing actions in an application using AI-driven systematic traversal techniques.

BACKGROUND

In modern software applications, APIs (Application Programming Interfaces) serve as the primary means of enabling system interactions, integrations, and automation. While many applications provide well-documented APIs for developers and third-party integrations, they may also contain undocumented APIs-APIs that exist within the application but are not officially disclosed in API documentation or user manuals. These undocumented APIs may be accessible through backend communications, internal workflows, or network traffic but remain untracked, untested, and unsupported from an official perspective.

The presence of undocumented APIs in an application introduces several technical and security challenges. From a security standpoint, undocumented APIs may expose sensitive data, internal system functions, or administrative controls that were not intended for public access. If these APIs lack proper authentication or rate limiting, they may become attack vectors for unauthorized access, data exfiltration, or service abuse. Additionally, organizations may be unaware of their existence, leaving them outside of compliance monitoring and security assessments.

From a software maintenance perspective, undocumented APIs pose risks to stability, compatibility, and integration management. Since they are not officially documented, developers and third-party integrators may unknowingly depend on them. If these APIs are modified, deprecated, or removed in future application updates, such dependencies can cause unexpected failures in integrations, automation workflows, and enterprise applications. Furthermore, without formal documentation, debugging and troubleshooting issues related to undocumented APIs become significantly more difficult.

Further, the undocumented APIs introduce business and competitive risks. Competitors or security researchers may reverse-engineer these APIs to uncover hidden features, internal data structures, or proprietary algorithms, potentially leading to competitive disadvantages or regulatory violations. Additionally, applications in regulated industries such as finance, healthcare, or government services may be required to fully document all API interactions to comply with legal standards such as GDPR, HIPAA, or PSD2. The presence of undocumented APIs can therefore expose organizations to compliance risks and legal liabilities.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The foregoing general description of the illustrative embodiments and the following detailed description thereof are merely exemplary aspects of the teachings of this disclosure and are not restrictive.

According to an aspect of the present disclosure, a method for automatically generating an action workflow for an application is provided. The method includes receiving, by a processor, application data comprising one or more of demo videos, clickstream data, a knowledge base, application credentials, an application workflow database, tickets, website information, or HAR files. The method further includes scanning, by the processor, the application by interacting with UI elements, logging interactions, and detecting a plurality of APIs. The method also includes identifying, by the processor, a set of undocumented APIs accessible through backend communications by deploying an AI agent configured to, at least one or more of, analyze network traffic, detect undocumented request patterns, compare API call sequences, and infer undocumented API structures based on observed interactions. The method further includes generating, by the processor, one or more action workflows, wherein an action workflow maps one or more APIs to an action associated with the application, wherein the one or more APIs are mapped from the plurality of APIs and the set of undocumented APIs. The method also includes applying, by the processor, a machine learning model to generate an action definition and an associated action icon. The method further includes displaying, by the processor, the action workflows on a user interface, enabling users to modify, simulate, and test actions. The method also includes continuously monitoring, by the processor, the application to detect modifications in one or more APIs, updating API mappings and action workflows in real time based on detected changes.

According to other aspects of the present disclosure, the method may include one or more of the following features. The AI agent may apply Retrieval Augmented Generation (RAG) to extract parameter descriptions, request-response relationships, and authentication requirements from external documentation sources, and may apply pointer-based prompt engineering to refine inferences based on contextual API usage patterns. The AI agent may compare the one or more undocumented APIs with existing API documentation, developer forums, and application knowledge bases by detecting missing parameters, analyzing request structure deviations, and identifying inconsistencies in authentication mechanisms. The method may further include updating, in real time, the one or more action workflows and the corresponding action definitions based on user input, wherein the user input may comprise at least one of a textual prompt or a drag-and-drop modification of an action icon on the user interface. The constructed structured API specification for undocumented APIs may comprise inferred field descriptions, supported request methods, expected response codes, and security requirements. The AI agent may employ context-driven API inference to determine undocumented API functionality based on the user interface context, associated feature usage, and API invocation sequences. The action workflow may categorize actions based on type, usage frequency, and topic. The machine learning model may assign confidence scores to inferred API mappings based on API response consistency, request pattern validation, and external documentation cross-referencing. The method may further comprise synthetic data generation for generating structured test cases to trigger API responses, regenerating values upon detecting anomalies, and modifying or deleting entries to infer API dependencies. The synthetic data generation process may utilize fuzzing techniques to inject structured and unstructured data into API request parameters to analyze undocumented API behavior and error responses. The method may further comprise reinitiating the scanning of the application in response to detecting at least one of an error during scanning, a change in the version of the application, or an application coverage level falling below a predefined threshold. The method may further comprise determining whether to perform sequential or parallel scanning of the application based on the number of APIs present in the application and deploys one or more scanning agents or servers to optimize scanning efficiency.

BRIEF DESCRIPTION OF FIGURES

The foregoing detailed description of embodiments is better understood when read in conjunction with the appended drawings. For the purpose of illustrating of the present subject matter, an example of a construction of the present subject matter is provided as figures, however, the invention is not limited to the specific system and method for automatically discovering and managing actions in an application using AI-driven systematic traversal techniques disclosed in the document and the figures.

The present subject matter is described in detail with reference to the accompanying figures. In the figures, the left-most digit(s) of a reference number identify the figure in which the reference number first appears. The same numbers are used throughout the drawings to refer to various features of the present subject matter.

Figure 1:
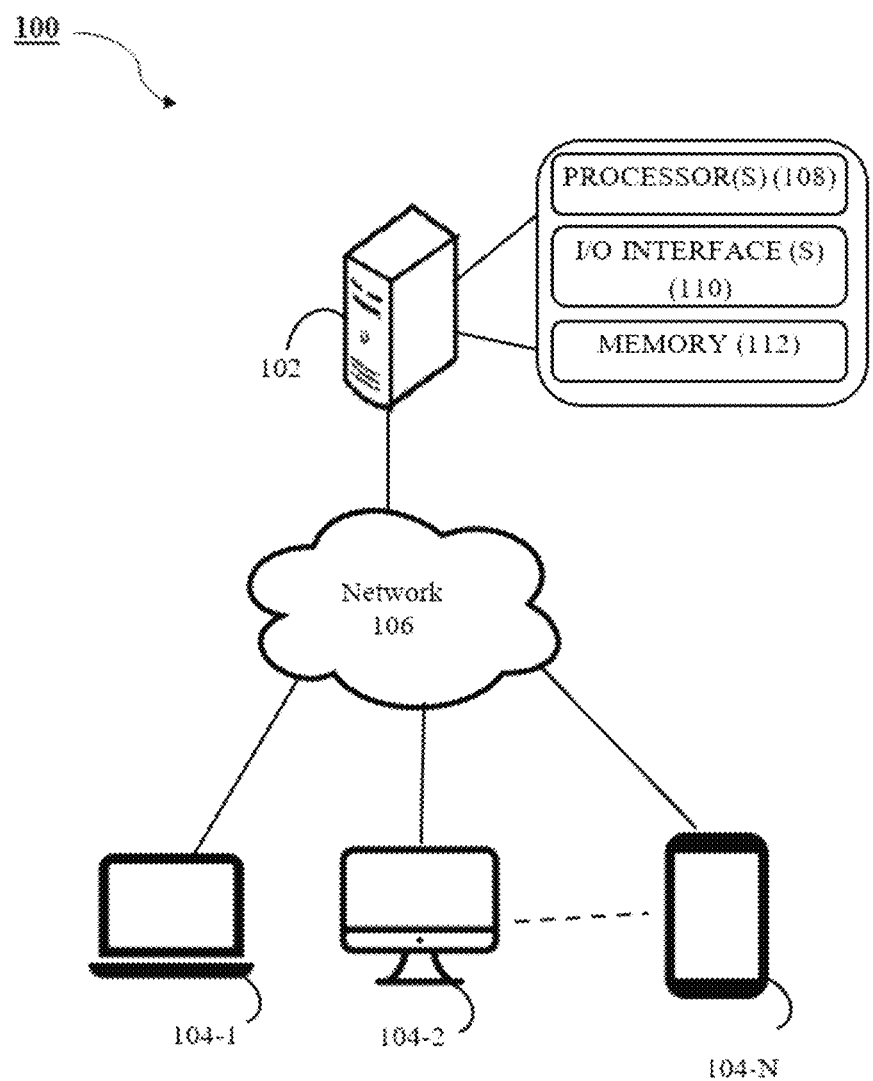
FIG. 1 illustrates a network implementation for automated application action discovery and management, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "scanning," "identifying," "mapping," "generating," "displaying," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present disclosure relates to a system and method for automatically discovering and managing actions in an application. The system may provide a comprehensive solution for identifying, cataloging, and managing features and their corresponding API calls within software applications. By combining various techniques such as UI scanning, network analysis, knowledge-base ingestion, and AI-driven exploration, the system may offer a robust approach to uncovering both documented and undocumented application capabilities.

In modern software ecosystems, undocumented APIs pose significant challenges, ranging from security vulnerabilities to integration difficulties. Developers often struggle with incomplete API specifications, making it difficult to build reliable automation workflows or integrate third-party services effectively. Traditional solutions rely heavily on static API documentation or network monitoring tools, which fail to provide a complete picture of how APIs function in real-world scenarios. These limitations create inefficiencies, requiring manual API discovery, trial-and-error testing, and time-consuming debugging processes. The present invention addresses these challenges by introducing an AI-driven approach that systematically scans applications, identifies both documented and undocumented APIs, and automatically generates structured API documentation.

Unlike traditional Robotic Process Automation (RPA) tools or conventional Selenium-based testing frameworks, which primarily focus on capturing user interface interactions, the present system may delve deeper into the application's underlying structure. The system may address the technical challenge of comprehensively mapping an application's full range of functionalities, including those not readily apparent through the user interface. This approach may be particularly valuable in complex enterprise applications where numerous API endpoints exist, some of which may not be fully documented or exposed in the UI. By employing AI-driven systematic traversal techniques and synthetic data generation, the system may uncover hidden or undocumented features that might otherwise remain undetected, thereby providing a more complete representation of an application's true capabilities.

It may be noted that the system scans and documents-undocumented APIs. While existing solutions rely on network monitoring, predefined crawling rules, or manually curated API documentation, the system actively analyzes API interactions and generates structured documentation using AI. The uniqueness is not just the use of AI but how AI is applied to infer, classify, and explain API behavior. Specifically, the system employs a combination of retrieval-augmented generation (RAG), pointer-based prompt engineering, and context-driven API inference to transform raw API calls into meaningful specifications.

Another major challenge in API automation is the inability to map APIs to actual application features. Existing API discovery tools only list available endpoints but fail to associate them with specific user actions or workflows. This results in an incomplete automation process, where APIs exist but are not actionable within business logic. The present invention bridges this gap by mapping APIs to their respective application functions, ensuring that each discovered API is directly tied to a real-world use case. This allows organizations to automate tasks without requiring extensive manual intervention or deep API expertise.

The AI agent operates by capturing API interactions from an application in real time. It monitors API request-response exchanges, extracting key elements such as query parameters, headers, request body fields, and response body fields. Unlike standard API documentation, which provides well-labeled parameters, undocumented APIs often lack meaningful names or descriptions, making them difficult to interpret. The system overcomes this by correlating observed API behaviors with application workflows to infer their function. This allows the system to systematically determine how an undocumented API is used within the application, even when no prior documentation exists.

The system utilizes context-based API field explanation. The system cross-references API request-response pairs with available knowledge bases, third-party documentation, and user interactions to infer what each API field represents. For example and not by way of any limitation, if an API returns a JSON response such as {"val": 5000, "dept": "sales"}, the system analyzes where and how this response is used within the application. The system then determines whether "val" represents revenue, budget, or another financial metric, ensuring accurate interpretation. This ability to dynamically explain each field within an undocumented API allows developers to understand and utilize APIs that were previously inaccessible.

To further enhance usability, the system automatically generates structured API documentation in a format similar to Swagger™ (OpenAPI) specifications, even for undocumented APIs. This documentation includes request parameters, response schemas, and authentication requirements, ensuring that developers can interact with undocumented APIs as if they were fully documented. By automatically building a machine-readable API reference, the system bridges the gap between undocumented API behavior and practical usability, reducing reliance on trial-and-error methods or manual documentation.

Unlike prior API discovery solutions, which primarily rely on network traffic logs, the present invention is guided by multiple data sources, including training videos, third-party documentation, and application knowledge bases. This approach allows the system to contextualize API interactions based on real-world usage. For example, if a training video demonstrates how a feature in an application is used, the system correlates this visual information with captured API calls, ensuring a feature-aware API discovery process. By incorporating multiple learning sources, the AI agent creates a more holistic understanding of how undocumented APIs function.

Furthermore, enterprise applications often undergo frequent updates, introducing new APIs or modifying existing ones. Keeping API documentation up to date is a resource-intensive process, leading to discrepancies between the actual API behavior and what is documented. The present invention addresses this issue by continuously monitoring API changes, automatically detecting modifications, and updating action workflows accordingly. This ensures that organizations maintain accurate API records and avoid disruptions caused by outdated documentation.

Finally, the system goes beyond simple API discovery by performing deep API feature mapping. It associates undocumented APIs with specific application functionalities by analyzing user interactions, UI elements, and backend processes. This mapping ensures that API discovery is not just a list of endpoints, but a functional representation of how APIs enable real-world features. Additionally, since APIs evolve over time, the system continuously updates its mappings, ensuring that changes in API behavior are reflected in workflow automation. This makes the system highly adaptive, improving software integration and automation while minimizing manual effort.

Referring now to FIG. 1, a network implementation 100 of a system 102 for automated application action discovery and management may be provided. The system 102 may include a processor 108 communicatively coupled to memory 110 and an interface 112. The processor 108 may execute instructions stored in the memory 110 to perform the various functions of the system 102.

The system 102 may be connected to one or more user devices 104-1, 104-2, . . . 104-N (collectively referred to as 104) via a network 106. The network 106 may include, but is not limited to, a local area network (LAN), wide area network (WAN), the Internet, wireless networks (e.g., Wi-Fi, cellular), or any combination thereof. The user devices 104 may include desktop computers, laptops, tablets, smartphones, or any other computing devices capable of interacting with the system 102.

In some aspects, the system 102 may be implemented as a cloud-based service, with the processor 108 and memory 110 distributed across multiple servers or data centers. Alternatively, the system 102 may be deployed on-premises within an organization's infrastructure.

The interface 112 may facilitate communication between the system 102 and external components, such as the user devices 104, target applications for action discovery, and various data sources. The interface 112 may include network adapters, APIs, or other communication protocols to enable seamless data exchange and interaction.

The memory 110 may store various modules and components of the system 102, including but not limited to a data ingestion layer, scanning and systematic traversal engine, action mapping and generation module, AI-driven icon and description generator, and continuous monitoring component. These modules may work in concert to perform the automated discovery and management of application actions.

In some implementations, the system 102 may also connect to external databases or knowledge bases to supplement its understanding of applications and their features. This connection may be established through secure channels over the network 106.

The user devices 104 may interact with the system 102 through a user interface, which may be web-based or a dedicated application. This interface may allow users to view discovered actions, modify them, and initiate scans or re-scans of target applications.

In some cases, the system 102 may employ load balancing and distributed computing techniques to handle multiple concurrent users and process large volumes of data efficiently. This may involve distributing tasks across multiple instances of the system 102 or leveraging cloud computing resources dynamically based on demand.

The network implementation 100 may also include security measures such as firewalls, encryption, and authentication protocols to ensure the integrity and confidentiality of data transmitted between the system 102, user devices 104, and target applications.

The system may receive access to an application and associated application data. The application data may comprise one or more of network calls, product analytics, demo videos, clickstream data, knowledge bases, an application credential, application workflow database, a ticket, a website, and HAR files. The application may have one or more APIs.

In an embodiment, a data ingestion layer of the system may source and process various types of application data to build a comprehensive understanding of the application's features and capabilities. This layer may handle multiple input sources, including network calls, product analytics, demo videos, clickstream data, and knowledge bases.

Network calls may represent the raw HTTP/HTTPS requests and responses captured during application usage. These calls may provide valuable insights into the underlying API structure and data flow within the application.

Product analytics may include metrics or telemetry data that reveal how users interact with the application. This data may encompass usage frequency, performance statistics, and other relevant metrics that can help identify popular features or potential areas for improvement.

Demo videos may serve as a rich source of information about the application's features and user flows. The system may analyze the demo videos, through transcription, to identify actions or workflows within the application.

Clickstream data may consist of logs detailing user clicks, page visits, or UI interactions. This data may provide insights into how users navigate the application and what actions they attempt to perform.

The knowledge base may include documentation or articles describing the product's features and APIs. This resource may contain references to application endpoints or workflows, which can be valuable for understanding the application's structure and capabilities.

In processing these diverse data sources, the system may employ various techniques to extract and normalize the information. For demo videos, the system may utilize transcription techniques to convert the audio or video content into text, which can then be analyzed for feature descriptions or user instructions. Clickstream data and product analytics may be parsed and aggregated to identify common user patterns or frequently accessed features.

The system may also parse and analyze HAR (HTTP Archive) files, which contain detailed information about web browser interactions with a website. The HAR files may provide information about network requests, including headers, parameters, and response content, which can be crucial for mapping UI actions to underlying API calls.

In some cases, when the internal knowledge base is unavailable or contains information below a certain threshold, the system may rely on third-party datasets to supplement its understanding of the application. These external sources may include public documentation, user forums, or open-source repositories related to the application or similar products in the same domain. The system may crawl and analyze these resources, extracting relevant information about features, API endpoints, or common usage patterns. This approach may allow the system to build a more comprehensive model of the application's capabilities, even when internal documentation is limited or outdated.

By ingesting and processing data from these diverse sources, the system may create a unified representation of the application's features and potential actions. This comprehensive dataset may serve as the foundation for subsequent stages of the system's operation, including systematic traversal and action mapping.

Further to receiving the application data, the system may initiate scanning of the application. A systematic traversal engine may interact with UI elements, log network calls, and deploy an AI agent for probing undocumented APIs. The systematic traversal engine may utilize a headless browser, such as Selenium™, to automate interactions with the application's user interface. The engine may systematically "click" on each UI element and fill in synthetic data for forms, simulating user interactions to explore the application's functionality.

During this process, the engine may capture and log every API call made by the application. These logs may include details such as the API path, parameters, headers, and the request/response payload. This comprehensive logging may provide deep visibility into the application's underlying structure and behavior.

The scanning and systematic traversal engine may operate in either parallel or sequential modes. In parallel mode, the system may spawn multiple threads or browser tabs to improve efficiency and explore multiple paths simultaneously. Alternatively, in sequential mode, the engine may perform a step-by-step traversal, which may be useful for avoiding concurrency issues or when a more methodical approach is desired.

Additionally, the system may deploy an AI agent as part of the scanning and systematic traversal engine to discover undocumented APIs. The AI agent may systematically probe additional paths or parameters that are not surfaced in the user interface, potentially uncovering hidden capabilities of the application. The AI agent may attempt to manipulate API endpoints, such as modifying path structures or altering parameters, to identify undocumented fields or functionalities. For example, if a known API endpoint is "/api/v1/contracts", the AI agent may attempt variations like "/api/v1/contracts/renewal" or "/api/v2/contracts" to discover potential hidden features. The AI agent is trained through a combination of prompting and fine-tuning techniques. In the prompting approach, the system provides detailed instructions to the agent on how to generate API request bodies, invoke API calls, and interpret API responses. In the fine-tuning approach, the agent is trained on historical datasets comprising complex API responses and multi-step execution sequences, enabling it to learn how to replicate those sequences accurately and adaptively. This dual training mechanism equips the AI agent with the ability to infer undocumented API functionality, construct valid requests, and interpret dynamic responses even in the absence of formal documentation.

In an example embodiment, the AI agent is trained using a hybrid approach that combines structured prompting and supervised fine-tuning. In the prompting-based training, the system provides the AI agent with detailed, instruction-driven examples on how to perform specific API-related tasks. For instance, the prompt may include a scenario such as:

"You are interacting with an internal application that manages employee records. To create a new employee, construct a POST request to/api/v1/employees. Use the following request body structure: {'name': 'John Doe', 'department': 'Engineering', 'role': 'Manager'}. If the API returns a 401 Unauthorized response, extract the 'Authorization' token from the login request and add it as a header."

This style of prompting trains the model to generalize request construction, interpret error codes, and apply corrective actions such as injecting authentication tokens or adjusting request parameters.

In the fine-tuning-based training, the system compiles a dataset of historical API interactions-particularly those involving large response payloads or multi-step action flows. For example, in a complex workflow that adds a new employee, assigns them to a department, and grants system access, the agent is fine-tuned using a sequence of recorded steps:

POST to/api/v1/employees→receive employee ID.

POST to/api/v1/departments/assign with {'employeeId': <ID>, 'department': 'Engineering'}.

POST to/api/v1/access/grant with {'employeeId': <ID>, 'roles': ['system_user']}.

This dataset includes both the request structures and the corresponding API responses. The agent learns how different steps relate to one another, how output from one request is input to another, and how to handle intermediate API errors such as missing fields or invalid role identifiers.

Through this dual training approach, the AI agent gains robust, contextual understanding of how to explore undocumented APIs, adapt to varied input-output structures, and synthesize coherent workflows from unstructured or partially-known data.

The AI agent may also analyze patterns in the discovered APIs and attempt to extrapolate new endpoints based on these patterns. This approach may enable the system to uncover APIs that are not explicitly referenced in the application's documentation or user interface, providing a more comprehensive understanding of the application's capabilities.

The AI agent operates using a multi-layered approach that combines heuristic-based probing, pattern recognition, machine learning-driven inference, and reinforcement learning to systematically uncover undocumented APIs. Initially, the agent captures network activity, user interactions, and request-response pairs from the application by analyzing traffic logs, intercepting API calls, and extracting endpoint structures. By employing a combination of static and dynamic analysis, the AI agent detects frequently used request patterns, common API naming conventions, and inferred parameter structures. This allows the AI agent to generate variations of known API endpoints, including modifications to URL paths, query parameters, request bodies, and HTTP headers. Furthermore, the agent employs fuzzing techniques to inject unexpected or randomized data into API requests, testing whether undocumented parameters or hidden features exist. If an undocumented API is discovered, the agent logs its structure, response format, authentication requirements, and inferred function, thereby expanding the system's API knowledge base.

The network activity refers to the communication data exchanged between the application and its backend servers during runtime. The AI agent captures and analyzes network activity to detect API calls, undocumented endpoints, and request-response structures that are not explicitly documented within the application. By systematically monitoring and interpreting network activity, the AI agent enables automated API discovery and inference, improving workflow automation and integration capabilities.

The AI agent captures network activity through various means, including traffic logs, intercepted API calls, and request-response pairs. Traffic logs are obtained from sources such as browser developer tools (e.g., HAR files), proxy-based network monitoring, or direct API tracing within the application. These logs contain critical metadata, including API request URLs, HTTP methods (e.g., GET, POST), headers, payload structures, authentication tokens, and response codes, which allow the system to reconstruct undocumented API interactions.

By intercepting API calls, the AI agent monitors both outgoing and incoming requests between the application frontend and backend servers. This helps identify which APIs are being invoked during user interactions and allows the AI agent to detect undocumented APIs that are not officially specified in the application's API documentation. The agent systematically extracts structured request-response pairs, which include API request formats and their corresponding server responses. These extracted data points enable the AI agent to infer API behavior, parameter structures, authentication mechanisms, and access control policies.

The AI agent applies modifications to intercepted API calls to test the existence of additional undocumented endpoints. This includes modifying URL paths, adjusting query parameters, altering request bodies, and injecting custom HTTP headers to determine if the application backend supports additional functionalities beyond documented APIs. For example, if the AI agent detects an API request to/api/v1/users, it may attempt variations such as/api/v1/users/details or/api/v1/users/settings to infer the existence of related undocumented APIs.

To enhance the accuracy of API discovery, the AI agent incorporates pattern recognition techniques to analyze recurring API call structures. By detecting repeated naming conventions and common request patterns, the agent infers potential API endpoints that follow similar structural patterns. For instance, if multiple detected API calls begin with /api/v1/inventory/, the agent may predict additional undocumented APIs related to inventory management, such as/api/v1/inventory/stock or/api/v1/inventory/orders.

Additionally, the AI agent employs fuzzing techniques to further explore undocumented APIs. Fuzzing involves injecting randomized or structured test inputs into API request parameters to detect undocumented features, hidden parameters, or security vulnerabilities. The agent sends various test inputs—including different data types, out-of-range values, and malformed requests—to observe how the API responds. If a previously undocumented parameter is accepted by the API and influences the response, the system logs it and updates the inferred API specification accordingly.

By continuously analyzing network activity, detecting undocumented APIs, and inferring API structures, the AI agent ensures comprehensive API documentation, improved workflow automation, and enhanced security analysis. This approach allows organizations to identify hidden functionalities, prevent unauthorized access, and optimize API-driven integrations while maintaining compatibility with evolving application architectures.

The AI agent leverages machine learning models to enhance its API discovery capabilities. A sequence-to-sequence deep learning model trained on known API structures and industry best practices can predict potential API paths that follow standard conventions. For example, if an application exposes an API endpoint such as "/api/v1/users", the AI agent may infer and test variations like "/api/v1/users/settings" or "/api/v1/users/preferences" based on observed patterns from similar applications. The AI agent also employs a reinforcement learning framework, wherein successful API discoveries are assigned higher weights, allowing the model to refine its search strategy over time. It continuously learns from both failed and successful attempts, dynamically adjusting its probing logic to prioritize variations that yield valid API responses. This iterative learning mechanism ensures that the AI agent becomes more efficient and precise with each subsequent scan of the application.

In addition to analyzing network activity and probing API endpoints, the AI agent processes application metadata, documentation, and even unstructured sources such as support tickets, developer forums, and version change logs. Natural language processing (NLP) techniques are applied to these textual resources to extract implicit API references, parameter hints, and potential authentication flows. By correlating this information with real-time scanning results, the AI agent can predict undocumented API functions with a higher degree of accuracy. Furthermore, the agent cross-references discovered API responses with existing API documentation to detect discrepancies, flagging undocumented fields, unexpected behaviors, or deprecated but still active endpoints. This level of analysis provides developers with a richer, more insightful view of the application's API surface.

The AI agent also incorporates an intelligent workflow engine to simulate real-world API interactions and validate undocumented endpoints. It systematically constructs API requests that mimic legitimate user actions, ensuring that the discovered APIs are not only functional but also correctly mapped to relevant application features. This simulation phase helps determine whether an API is internally used by the application but not exposed in official documentation, or if it represents an unused, legacy, or experimental feature. Additionally, the AI agent can assess whether an API enforces access control mechanisms by testing variations of authentication headers, token expirations, and role-based access levels. If an API responds differently based on these factors, the agent logs this behavior, categorizing it for further security or compliance evaluation.

To ensure scalability and efficiency, the AI agent employs a distributed architecture, allowing multiple scanning and discovery processes to run in parallel across different environments or application versions. This is particularly useful for monitoring applications that undergo frequent updates, as the AI agent can detect and adapt to changes in the API structure in real time. Whenever a new application version is detected, the AI agent automatically re-initiates its scanning and mapping procedures, comparing newly discovered APIs with previous versions. If discrepancies are found, it highlights modified, deprecated, or newly introduced APIs, assisting developers in maintaining up-to-date API documentation and ensuring backward compatibility. By continuously monitoring and learning from evolving API structures, the AI agent provides an automated, intelligent, and highly adaptable approach to discovering and documenting hidden API capabilities within complex software ecosystems.

It may be noted that the AI agent goes beyond mere API discovery by generating structured documentation that enables developers to interpret and use undocumented APIs effectively. This includes defining each API's expected inputs, outputs, authentication requirements, and dependencies. The system constructs a specification similar to a Swagger (OpenAPI) definition, ensuring that even undocumented APIs are as usable as formally documented ones. The AI agent accomplishes this by analyzing each field in the API request and response, leveraging retrieval-augmented generation (RAG) to pull insights from application documentation, knowledge bases, third-party sources, and user interactions. Additionally, it employs pointer-based prompt engineering, ensuring that the AI model systematically interprets and explains API parameters in a context-aware manner. This allows the system to dynamically infer and refine parameter meanings based on real-time application behavior.

The AI agent also introduces a novel method for context-driven API inference, where it determines the function of an API based on where and how it is invoked within an application. For instance, if an API request is observed when a user navigates to a billing page, the system correlates this invocation with previously known financial APIs to determine whether the API relates to payment processing, invoice retrieval, or tax calculations. This contextual understanding is further refined by analyzing related UI components, workflow sequences, and historical API responses, allowing the system to generate precise action mappings that link undocumented APIs to specific application features. By incorporating application workflow data and real-time interactions, the AI agent ensures that discovered APIs are not just cataloged as endpoints but are meaningfully integrated into the broader software ecosystem.

Another key capability of the AI agent is its ability to infer API parameter constraints and expected values by analyzing response variations across multiple requests. It applies pointer-based prompt engineering to identify and define undocumented parameters, ensuring that API documentation is generated with high accuracy. If a specific field consistently returns values within a defined numerical range, the system can infer and document that the field likely represents a bounded metric, such as a percentage, timestamp, or monetary value. Similarly, if certain API calls fail unless a required parameter is present, the AI agent automatically determines the parameter's necessity and suggests default values or recommended formats. These insights allow developers to utilize undocumented APIs efficiently, reducing reliance on trial-and-error experimentation. The system also detects dynamic dependencies between API calls, identifying cases where a request must be made in a specific sequence to obtain valid responses. This information is used to construct optimized action workflows that maintain execution integrity.

To further improve accuracy, the AI agent integrates an interactive validation mechanism where inferred API specifications are iteratively refined based on real-time execution feedback. This process involves sending API requests using the discovered parameters and observing response consistency over multiple trials. If discrepancies arise between expected and actual results, the AI model adapts by modifying parameter structures, re-evaluating inferred field mappings, and adjusting workflow associations. The system also incorporates active learning techniques, wherein newly validated API insights enhance future API predictions, effectively creating a self-improving discovery model. The use of retrieval-augmented generation (RAG) ensures that any new documentation, support tickets, or developer discussions can be instantly referenced to refine API definitions dynamically.

The AI agent additionally extends its analysis beyond API traffic and application interactions by leveraging external sources such as developer forums, public API repositories, and software update logs to validate its findings. By integrating retrieval-augmented generation, the system improves its ability to detect industry-standard API conventions, identify alternative endpoint variations, and recognize de facto standards used across similar applications. This capability ensures that even in cases where an undocumented API lacks internal references, the AI agent can infer its behavior based on external contextual knowledge, further strengthening the reliability and completeness of its generated documentation.

Lastly, the AI agent provides a structured visualization of API interactions by generating a dependency graph that links each discovered API to relevant UI actions, backend processes, and associated authentication flows. This visualization allows developers to quickly understand how APIs interact within an application and enables efficient debugging, security audits, and workflow optimization. Additionally, the system assigns confidence scores to each API inference, ranking discovered APIs based on their likelihood of correctness and relevance. By continuously refining its analysis, generating machine-readable API specifications, and incorporating real-time feedback, the AI agent delivers an end-to-end solution for API discovery, documentation, and integration, significantly reducing the complexity associated with undocumented APIs.

Further, the action mapping and generation module may correlate UI features with corresponding API calls to create a comprehensive representation of the application's capabilities. This module may analyze recorded interactions and network requests to identify which API calls correspond to specific features within the application.

In some cases, the module may correlate relevant metadata, such as roles, parameters, and request/response structures, to build a detailed "action" definition. Each action may represent a high-level abstraction of one or more underlying API calls, such as create, update, delete, or fetch operations.

The module may implement role-based tagging to associate actions with specific user roles or credentials. This tagging system may help in organizing and managing access control for different actions within the application.

To further organize the discovered actions, the module may categorize them based on domain topics or usage types. In an example and not by way of any limitation, the domain topics may include areas such as spend management, onboarding, or offboarding, while usage types may refer to the nature of the action, such as data retrieval or modification.

In some implementations, the module may employ a ranking mechanism to sort or prioritize actions. This ranking may be based on various factors, such as the frequency of use or the perceived importance of the action within the application. By analyzing usage patterns and other relevant data, the system may assign higher ranks to actions that are more frequently accessed or considered critical for end users. This ranking feature may help users and developers focus on the most relevant or commonly used actions within the application.

The action mapping and generation module may play a crucial role in bridging the gap between the user interface and the underlying API structure of the application. By creating a structured representation of actions, complete with metadata and rankings, the module may enable more efficient management and utilization of the application's features.

The AI-Driven Icon & Description Generator component of the system may utilize machine learning models to create visual and textual representations for each discovered action. This component may enhance the user experience by providing intuitive icons and clear descriptions for the actions identified within the application.

In some cases, the system may employ an ML-based icon generator, which may be referred to as IconGen, to create a unique icon for each action. IconGen may be a convolutional neural network (CNN) trained on a large dataset of icons and their associated metadata. The training process for IconGen may involve feeding the model with pairs of icon images and corresponding textual descriptions or tags. This approach may enable IconGen to learn the relationships between visual elements and semantic concepts.

When generating an icon for a new action, IconGen may receive the action's context, such as its name, category, or associated API endpoints, as input. Based on this information, IconGen may produce a representative icon that visually conveys the action's purpose or functionality. For example, if an action is related to financial transactions, IconGen may generate an icon featuring currency symbols or a wallet graphic.

The system may also utilize a large language model (LLM), which may be referred to as ActionDescribe, to produce textual definitions for each action. ActionDescribe may be based on a transformer architecture and may be pre-trained on a diverse corpus of text data, including technical documentation, user manuals, and general knowledge sources. This pre-training may provide ActionDescribe with a broad understanding of language and context.

To generate action descriptions, ActionDescribe may undergo fine-tuning on a dataset specific to software applications and API documentation. This fine-tuning process may involve training the model on examples of API endpoints, their corresponding functionalities, and human-written descriptions. The fine-tuning may help ActionDescribe learn the specific language and structure commonly used in describing software actions and API calls.

When creating a description for a newly discovered action, the system may provide ActionDescribe with relevant information such as the action's name, associated API endpoints, parameters, and any available metadata. ActionDescribe may then generate a natural language description that explains the action's purpose, functionality, and potential use cases. These descriptions may aid user comprehension by providing clear and concise explanations of each action's capabilities.

In some cases, the system may implement a feedback loop to improve the quality of both the generated icons and descriptions over time. This feedback loop may involve collecting user ratings or corrections for the generated content. The system may use this feedback to fine-tune IconGen and ActionDescribe, potentially improving their accuracy and relevance in future iterations.

The combination of visually appealing icons generated by IconGen and informative descriptions produced by ActionDescribe may create a more intuitive and user-friendly representation of the application's actions. This approach may help users quickly understand and navigate the discovered functionalities, potentially improving overall usability and adoption of the application's features.

Further, the system may provide a user interface that displays the discovered actions along with their associated icons, descriptions, and API path details. This interface may allow users to interact with and modify the actions in real-time, providing flexibility and customization options.

In some cases, the user interface may support drag-and-drop functionality, enabling users to rearrange the sequence of actions or group related actions together. This feature may be particularly useful for creating custom workflows or organizing actions based on specific criteria, such as frequency of use or business processes.

The system may also offer text-based prompts for modifying actions. Users may be able to edit action names, descriptions, or associated metadata directly within the interface. As users make changes, the system may update the action representations in real-time, reflecting the modifications immediately.

In some implementations, the user interface may provide options for filtering or sorting actions based on various criteria, such as action type, domain topic, or user role. This functionality may help users quickly locate specific actions or focus on a particular subset of actions relevant to their needs.

The system may incorporate role-based access controls within the user interface. In some cases, when a user provides input regarding their role or permissions, the system may dynamically update the displayed sequence of actions in real-time. This feature may ensure that users only see and interact with actions appropriate for their role within the organization.

In some cases, the user interface may include a simulation or test mode. This mode may allow users to execute an action end-to-end within the system, validating its functionality without affecting the actual application environment. Users may be able to input test data and observe the results of the action, helping them understand the action's behavior and confirm its correct implementation.

The system may provide visual feedback to users as they interact with the interface. For example, when a user modifies an action, the system may display indicators or notifications to confirm the changes have been applied successfully. This real-time feedback may help users understand the impact of their modifications and ensure that the desired changes have been implemented correctly.

In some implementations, the user interface may offer collaboration features, allowing multiple users to work on action management simultaneously. The system may update the interface in real-time to reflect changes made by different users, facilitating teamwork and ensuring all users have access to the most up-to-date information.

The user interface may also provide options for exporting or sharing the discovered and modified actions. Users may be able to generate reports or documentation based on the current state of the actions, which can be useful for team communication, compliance purposes, or integration with other systems.

In some cases, the system may offer a versioning mechanism within the user interface. This feature may allow users to track changes made to actions over time, compare different versions, and revert to previous states if needed. The versioning system may provide an additional layer of control and transparency in managing the application's actions.

The real-time update capabilities of the system may extend beyond user-initiated changes. As the continuous monitoring and re-scanning processes detect changes in the application or discover new actions, the user interface may automatically update to reflect these changes. This dynamic updating may ensure that users always have access to the most current and comprehensive set of actions available in the application.

The system may implement continuous monitoring and triggered re-scanning processes to ensure that the discovered set of actions remains up-to-date and comprehensive. These processes may enable the system to detect changes in the application and maintain an accurate representation of its capabilities.

In some cases, the system may employ a coverage metric to assess the extent of tested features within the application. This metric may be calculated based on various factors, such as the number of UI elements interacted with, the proportion of API endpoints discovered, or the depth of traversal achieved during scanning. If the coverage metric falls below a predetermined threshold, the system may automatically trigger a new scan to explore potentially undiscovered areas of the application.

The system may also incorporate error detection mechanisms to identify anomalies or unexpected behaviors during the scanning process. When an error or anomaly is encountered, the system may log the incident and, depending on the nature and severity of the issue, initiate a re-scan of the affected area or the entire application. This approach may help ensure that temporary glitches or intermittent issues do not result in incomplete or inaccurate action sets.

In some implementations, the system may monitor for application upgrades or version changes. Upon detecting a new version or significant update, the system may automatically initiate a comprehensive re-scan to identify new or altered endpoints. This process may involve comparing the newly discovered API structure with the previously recorded action set, allowing the system to update existing actions, add new ones, or deprecate those that are no longer valid.

The system may utilize various techniques to detect changes in the application. These techniques may include monitoring application metadata, such as version numbers or release notes, analyzing network traffic for new patterns or endpoints, and periodically sampling UI elements to check for modifications. By employing multiple detection methods, the system may increase its chances of identifying both major and minor changes in the application's structure or behavior.

In some cases, the system may implement a differential scanning approach when re-scanning an application. Instead of performing a full scan every time, the system may focus on areas that have changed or are likely to have been affected by updates. This targeted approach may improve efficiency and reduce the time required to update the action set.

The system may maintain a history of discovered actions and their associated metadata. When changes are detected, the system may compare the new findings with this historical data to identify trends, track the evolution of features, and potentially predict future changes or deprecations.

In some implementations, the system may interface with existing API testing or documentation platforms to cross-verify discovered endpoints. For example, the system may integrate with tools such as Postman or Swagger to compare its findings with documented API specifications. This integration may help validate the accuracy of the discovered actions and potentially identify discrepancies between the actual application behavior and its official documentation.

The continuous monitoring and triggered re-scanning processes may enable the system to adapt to changes in the application dynamically. By maintaining an up-to-date and accurate representation of the application's capabilities, the system may provide users with reliable and current information about available actions, enhancing the overall utility and effectiveness of the action discovery and management system.

The system may integrate various components to achieve comprehensive functionality in automatically discovering and managing actions within an application. This integration may enable seamless operation across different stages of the process, from data ingestion to action presentation and continuous monitoring.

In some cases, the system may employ advanced video recognition techniques to analyze tutorial videos and automatically reproduce the steps demonstrated. This capability may enhance the system's ability to learn new features and workflows, potentially expanding its understanding of the application beyond what is explicitly documented or immediately visible in the user interface.

The system may be deployed flexibly to accommodate different organizational needs and security requirements. In some implementations, the system may be offered as a cloud service, providing scalability and ease of access. Alternatively, the system may be installed on-premises, allowing organizations to maintain full control over their data and infrastructure.

To address the diverse needs of different industries and application domains, the system may incorporate domain-specific knowledge and specialized classification models. For example, in financial applications, the system may utilize models trained on financial terminology and common transaction patterns. Similarly, for healthcare applications, the system may employ models that understand medical terminology and comply with relevant data protection regulations. This adaptability may enable the system to more accurately identify and categorize actions within specialized domains.

The seamless integration of these components and capabilities may result in a dynamic and adaptive system. As the application evolves or new features are introduced, the continuous monitoring and re-scanning processes may trigger updates to the discovered action set. These updates may be reflected in real-time through the user interface, ensuring that users always have access to the most current and comprehensive representation of the application's capabilities.

Figure 2:
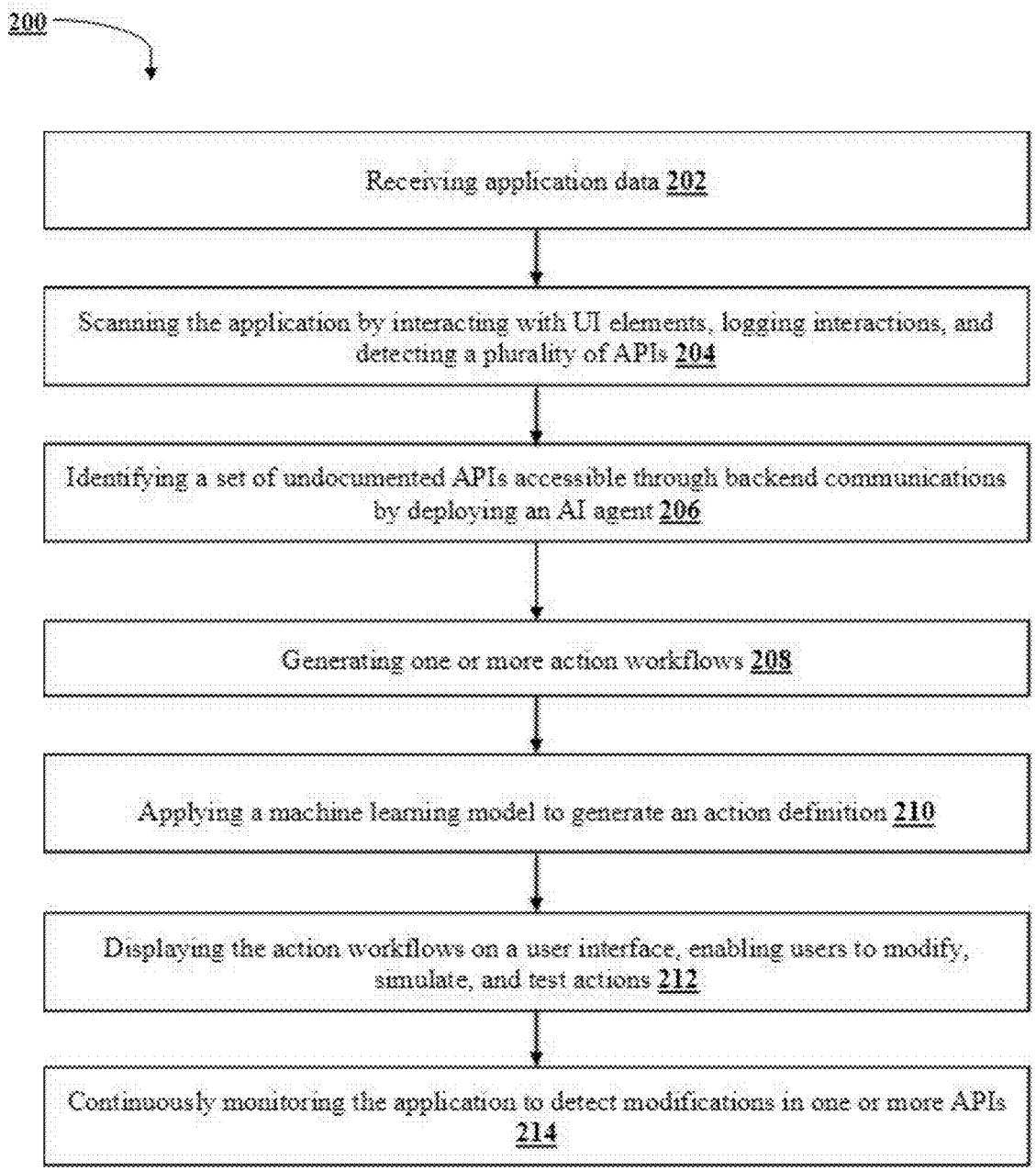
FIG. 2 is a flowchart illustrating an example method for automated application action discovery and management.

Referring now to FIG. 2, a method 200 for automatically discovering and managing actions in an application is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for automatically discovering and managing actions in an application. Additionally, individual blocks may be deleted from the method 200 without departing from the scope of the subject matter described herein. Furthermore, the method 200 for automatically discovering and managing actions in an application can be implemented in any suitable hardware, software, firmware, or combination thereof. However, for ease of explanation, in the embodiments described below, the method 200 may be considered to be implemented in the above-described system 102.

At step 202, application data may be received. The application data may comprise one or more of demo videos, clickstream data, a knowledge base, application credentials, an application workflow database, tickets, website information, or HAR files.

At step 204, the application may be scanned by interacting with UI elements, logging interactions, and detecting a plurality of APIs.

At step 206, a set of undocumented APIs accessible through backend communications may be identified by deploying an AI agent. The AI agent may be configured to, at least one or more of, analyze network traffic, detect undocumented request patterns, compare API call sequences, and infer undocumented API structures based on observed interactions.

At step 208, one or more action workflows may be generated. An action workflow maps one or more APIs to an action associated with the application. The one or more APIs are mapped from the plurality of APIs and the set of undocumented APIs.

At step 210, a machine learning model may be applied to generate an action definition and an associated action icon.

At step 212, the action workflow along with the action definition and the action icon may be displayed on a user interface. The display may enable the user to modify, simulate, and test actions.

At step 214, the application may be continuously monitored to detect modifications in one or more APIs, updating API mappings and action workflows in real time based on detected changes.

In an embodiment, the system employs an AI-driven automated crawling mechanism to traverse an application, interact with UI elements, and extract API-related data for analysis. This process enables the system to identify both documented and undocumented APIs, infer request-response structures, and determine authentication mechanisms dynamically. The AI agent operates through a headless browser-based automation framework (e.g., Selenium™), executing predefined commands to interact with UI elements and monitor network activity.

The system initiates the crawling process by simulating real-world user interactions, beginning with authentication and login. The AI agent detects input fields for credentials such as username and password, populates them with predefined login credentials, and submits the form. Once authenticated, the system captures network activity, extracting authentication tokens, session cookies, and security headers (e.g., X-Token, Authorization). These authentication parameters are stored and reused for seamless API interaction throughout the application.

Following authentication, the AI agent systematically navigates the application interface by interacting with UI components such as menu items, buttons, and dropdowns. It scans the UI for clickable elements and executes SEARCH_BY_TEXT or CLICK_ELEMENT operations to traverse the application. During this traversal, the system logs all API calls triggered by user interactions, capturing HTTP methods (GET, POST, PUT, DELETE) and critical attributes such as endpoint URLs, request bodies, query parameters, authentication headers, and response payloads. If the same API is invoked multiple times with different parameters, the system infers its expected input fields and request structure by analyzing response variations, allowing it to reconstruct API specifications dynamically.

To enhance API inference, the AI agent applies retrieval-augmented generation (RAG) to extract parameter descriptions, authentication requirements, and request-response relationships from both observed API traffic and external documentation sources. Additionally, pointer-based prompt engineering refines API mapping based on contextual application usage patterns. For example, if a search API (/api/v1/search) is invoked for users, departments, and applications, the system analyzes response structures and identifies commonalities to generate a generalized API specification.

To refine its understanding, the system performs exploratory API calls by modifying known request structures. If an identified API endpoint is/api/v1/users, the AI agent tests variations such as/api/v1/users/details or/api/v1/users/settings to discover additional functionalities. If authentication errors occur, the AI agent extracts required tokens by analyzing session cookies, authorization headers, and proprietary security parameters. It iteratively adjusts request formats until a valid response is received, determining the authentication scheme required to access undocumented APIs.

Once an API sequence is identified, the system maintains a structured repository of API endpoints, associating them with specific application actions inferred from UI interactions. This repository is continuously updated as the system revalidates API calls in real time, ensuring API mappings remain current as the application evolves. Additionally, the system constructs machine-readable API documentation, similar to OpenAPI (Swagger), enabling seamless integration into automation workflows and third-party systems.

By combining UI-based navigation, real-time API logging, and AI-powered inference, the system optimizes API discovery and integration, providing an efficient and automated approach to uncovering undocumented APIs, handling authentication requirements, and dynamically generating API specifications.

Figure 3:
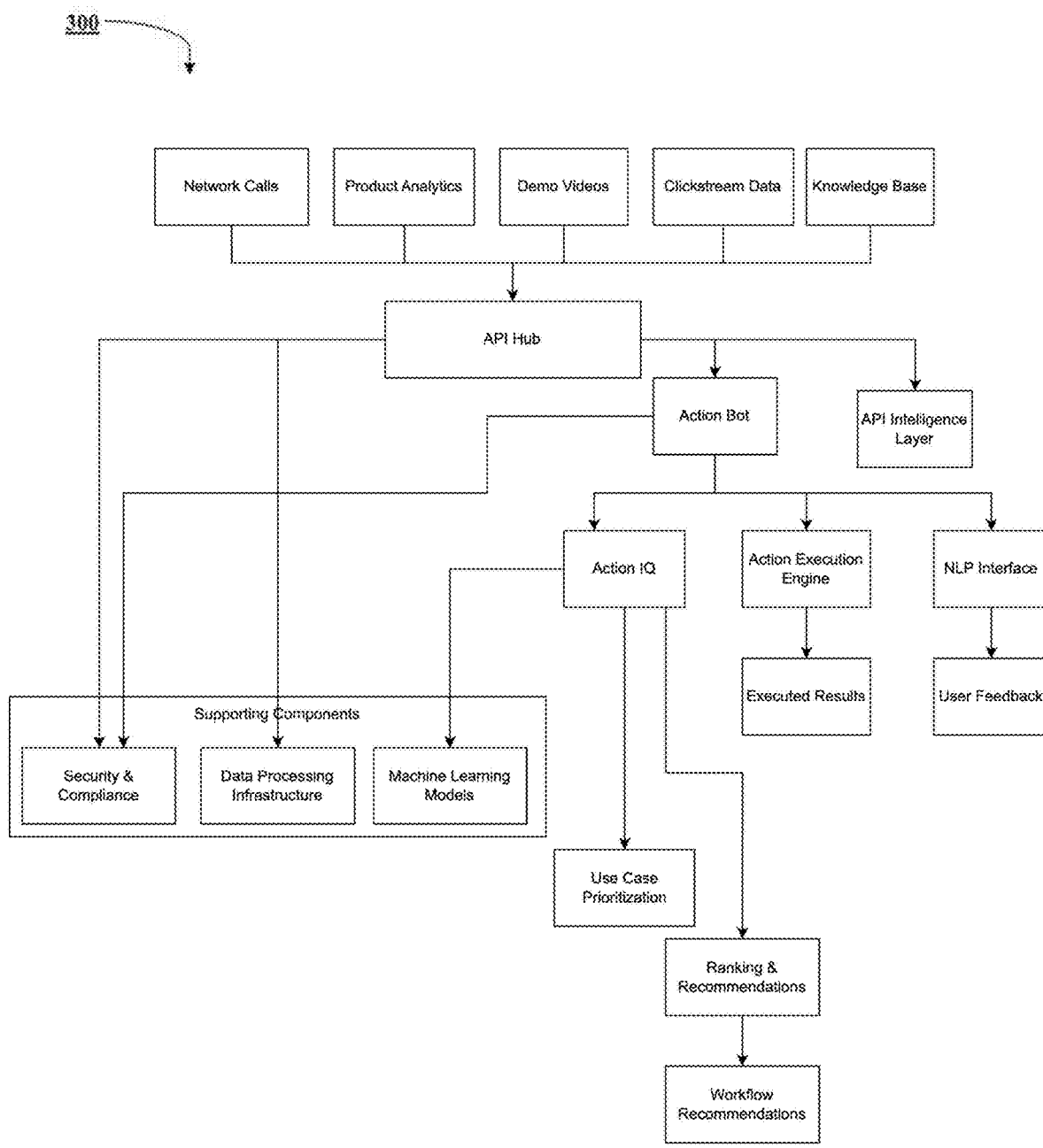
FIG. 3 is a diagram illustrating components of an AI-powered API discovery and workflow automation system, in accordance with an embodiment of the present subject matter.

The AI-powered API discovery and workflow automation system 300, as illustrated in FIG. 3, comprises a comprehensive architecture designed to process various data inputs and generate actionable workflow recommendations. The system integrates multiple components that work in concert to analyze, understand, and optimize API interactions within applications.

At the core of the system is the API Hub, which serves as a central repository for API-related information. This hub receives inputs from diverse data sources, including, but not limited to, network calls, product analytics, demo videos, clickstream data, and knowledge bases. By consolidating these varied inputs, the API Hub creates a rich foundation for subsequent processing and analysis.

The system employs an Action Bot that utilizes the collected API data to automate tasks and generate workflows. Working in tandem with the Action Bot, an API Intelligence Layer enhances the understanding of APIs and their mappings within the application ecosystem. This layer may employ advanced techniques to interpret API structures, relationships, and functionalities.

An Action IQ component processes the insights gathered by the Action Bot, refining them for practical execution. This refinement process is crucial for translating raw API data into meaningful actions that can be implemented within workflows.

The system incorporates a Use Case Prioritization module, which determines the most relevant actions for users based on various factors such as frequency of use, importance, and user preferences. This prioritization ensures that the most valuable and impactful workflows are identified and presented to users.

Supporting the core functionality are several key components. A Security & Compliance module ensures that all API interactions adhere to necessary security protocols and compliance requirements. A robust Data Processing Infrastructure handles the large-scale data processing demands of the system, enabling efficient analysis of vast amounts of API-related information.

Machine Learning Models play a critical role in enhancing API discovery and ranking. These models may analyze patterns in API usage, predict potential API interactions, and continuously improve the system's ability to identify and categorize APIs accurately.

The Ranking & Recommendations component utilizes the processed data and machine learning insights to prioritize actions based on relevance and past executions. This component feeds into a Workflow Recommendations module, which suggests optimized workflows based on learned patterns and user behavior.

An Action Execution Engine implements the API-based workflows, translating the system's recommendations into concrete actions within the application. The results of these executions are captured and logged, providing valuable feedback for future optimizations.

The system incorporates a Natural Language Processing (NLP) Interface that accepts and processes user feedback. This interface allows users to provide input on the generated workflows, which the system then uses to refine and improve future recommendations.

In some cases, the system may use AI-driven systematic traversal to discover undocumented or hidden APIs associated with the application. This capability allows the system to uncover API functionalities that may not be explicitly documented or exposed through conventional means, potentially revealing additional features or capabilities that can be incorporated into workflows.

The AI-powered API discovery and workflow automation system represents a sophisticated approach to understanding, optimizing, and automating API interactions within applications. By leveraging diverse data sources, advanced AI techniques, and continuous learning mechanisms, the system aims to provide users with powerful, context-aware workflow recommendations that evolve and improve over time.

In an example and not by way of any limitation, the system is applied to a Customer Relationship Management (CRM) tool to automate API discovery, action workflow generation, and feature mapping. The system receives comprehensive data related to the CRM tool, including user interactions, network traffic logs, API documentation, and clickstream data. By analyzing this data, the system systematically scans the CRM's UI elements, workflows, and API calls, extracting structured insights into its functionality.

Upon processing, the system identifies that the CRM solution consists of 35 distinct features, such as lead management, contact tracking, email automation, deal pipeline, reporting, and customer support ticketing. Each feature is further broken down into 50 different user actions, such as creating a new contact, updating a lead status, generating a sales report, or automating an email sequence. The system maps these actions to 10 documented APIs that are explicitly exposed for integration and interaction.

Through its graph-based message passing and attention mechanism, the system also discovers 3 hidden APIs that are not documented in the CRM's API reference but are actively used in system workflows. For example, while the API documentation explicitly details an endpoint for fetching customer details (/api/v1/customers), the system detects an undocumented API (/api/v1/customers/priority) that retrieves priority customer data, which may be used internally by the CRM but is not publicly exposed. Similarly, an API for bulk importing contacts (/api/v1/import/contacts) is inferred from network traffic logs, even though it is not included in the official API documentation.

Once API discovery is complete, the system automatically generates action workflows for each feature. For instance, the "Lead Management" feature is broken down into a structured workflow:
  a. Fetch all active leads by calling the GET/api/v1/leads endpoint.
  b. Check lead qualification score using the hidden API GET/api/v1/leads/qualification.
  c. Assign the lead to a sales representative via POST/api/v1/leads/assign.
  d. Track lead interactions by analyzing clickstream and UI interactions.

For features requiring multiple API interactions, such as email automation, the system builds an optimized workflow:
  a. Retrieve email templates from GET/api/v1/email/templates.
  b. Fetch recipient details based on lead information (GET/api/v1/leads).
  c. Send email via POST/api/v1/email/send, integrating dynamic placeholders from CRM data.
  d. Log email delivery status by checking the GET/api/v1/email/status API.

Additionally, the system assigns confidence scores to each generated workflow, highlighting reliable API mappings versus inferred API interactions. Users can review these workflows, modify request parameters, and validate execution before deployment.

Through its reinforcement learning-based optimization, the system continuously improves API detection, workflow accuracy, and feature mapping by incorporating user feedback and monitoring CRM updates. This ensures that the generated workflows remain accurate even as the CRM software evolves, reducing manual effort while optimizing API utilization.

This example demonstrates how the system can be deployed in a real-world CRM solution to automate API discovery, generate actionable workflows, uncover hidden API capabilities, and enhance software integration efficiency.

Figure 4:
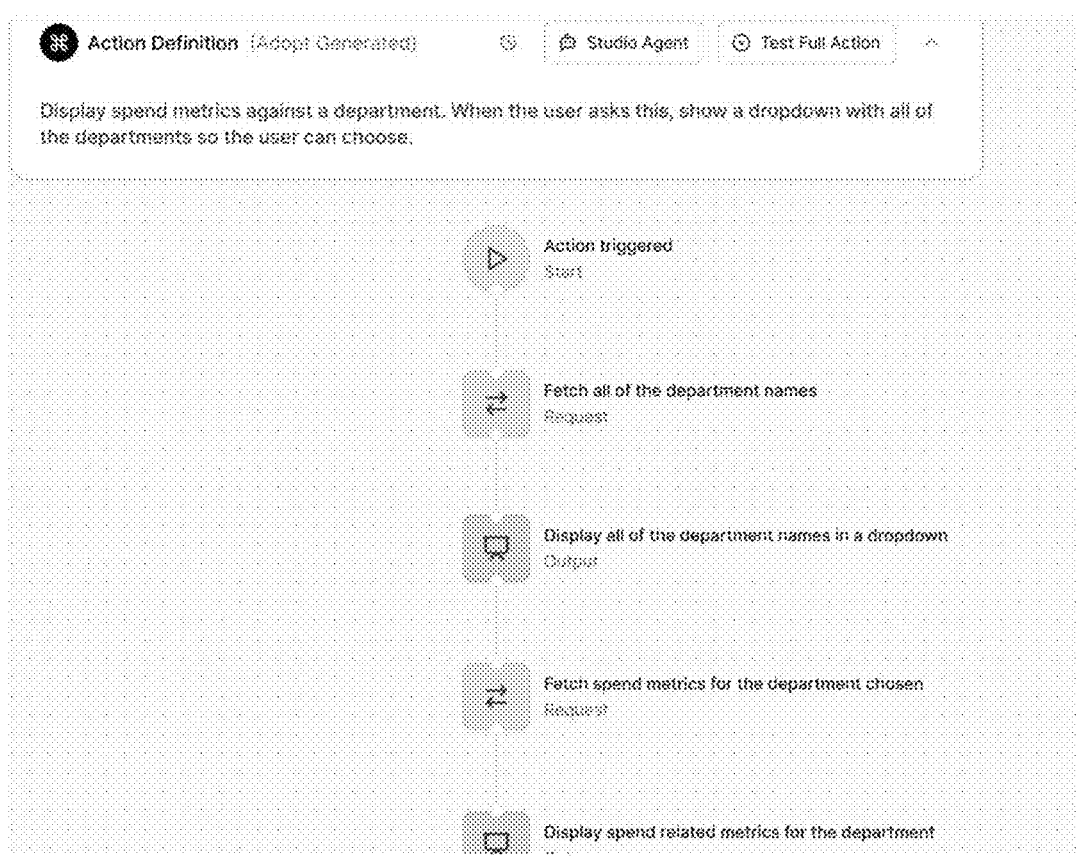
FIG. 4 is a diagram illustrating an example of User Interface depicting action workflow created by scanning an application, in accordance with an embodiment of the present subject matter.

FIG. 4 illustrates an example interface 400 depicting an action workflow and action definition generated by the system for spend analysis of a company. The system autonomously scans the application, identifies key interactions, and maps each step required to execute the requested action. The action definition, displayed at the top of FIG. 4, is automatically generated using a large language model (LLM) that interprets user intent and converts it into structured workflows. These workflows consist of sequential steps that interact with the application's backend APIs and user interface components to achieve the desired action.

In this example, the workflow is designed for a Software Spend Management Tool, where the system first fetches all department names via an API request. It then displays the department names in a dropdown menu, allowing the user to select a department for analysis. Once the user makes a selection, the system fetches the spend metrics associated with the chosen department by querying relevant financial data. Finally, it displays the spend metrics, enabling the user to analyze expenditures and make data-driven decisions.

Although the example is specific to a Software Spend Management Tool, the system is designed to work with all kinds of software. It is capable of autonomously scanning applications, discovering APIs, and generating action workflows across various domains, including customer relationship management (CRM), human resource management (HRM), enterprise resource planning (ERP), cybersecurity, financial management, and healthcare systems. By leveraging AI-based analysis, the system dynamically adapts to different software environments, ensuring accurate and efficient workflow automation regardless of the application's purpose or industry.

Figure 5:
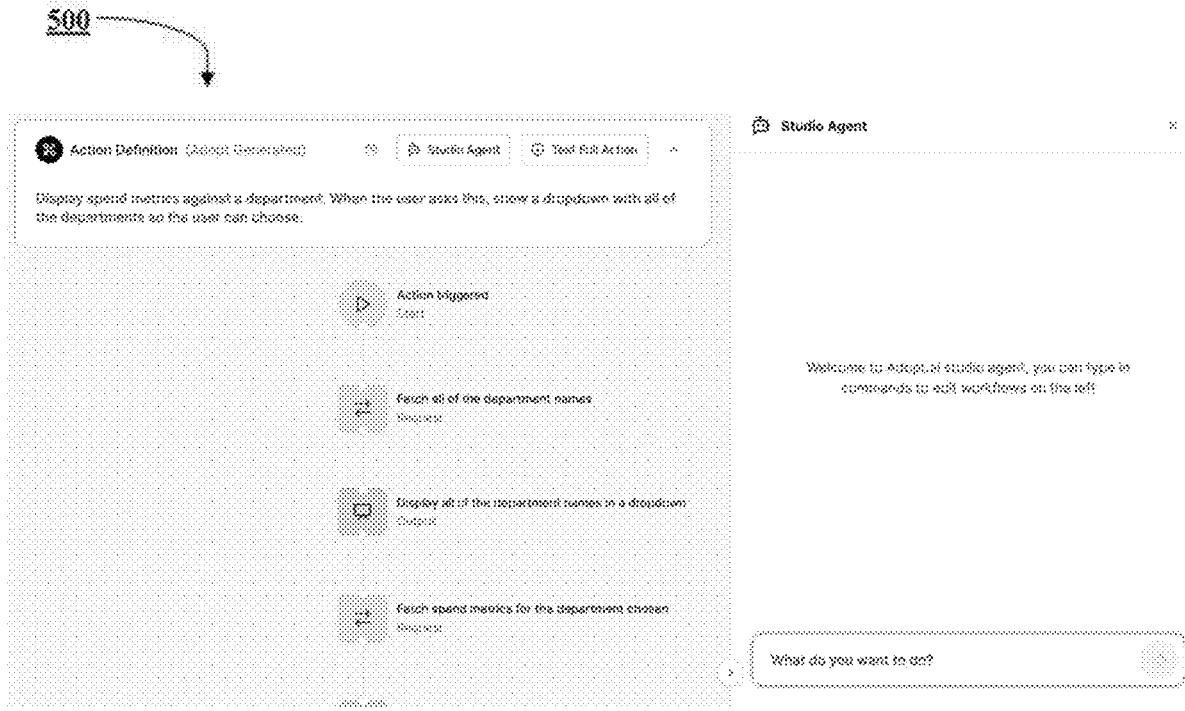
FIG. 5 is a diagram illustrating an example of User Interface depicting an input box for user feedback on an action workflow, in accordance with an embodiment of the present subject matter.

The system incorporates a user feedback mechanism to refine and improve the action workflows generated through automated discovery. As illustrated in FIG. 5, the user interface 500 shows an input box to users, allowing the users to provide feedback on the created action workflow.

In some cases, users may input comments, suggestions, or corrections related to the generated workflow. This feedback may include information about missing steps, incorrect API mappings, or suggestions for optimizing the workflow. The system may process this user input using natural language processing techniques to extract relevant information.

The user feedback mechanism may serve multiple purposes in enhancing the overall system performance. In some cases, it may help identify and correct errors in the automated discovery process. For example, if the system incorrectly maps a UI action to an API call, a user may point out this discrepancy through the feedback mechanism.

Additionally, user feedback may provide valuable insights into real-world usage patterns and preferences that may not be immediately apparent from automated scanning alone. In some cases, users may suggest more efficient ways to structure the workflow based on their domain expertise or specific use cases.

The system may incorporate this feedback in real-time, allowing for immediate improvements to the action workflow. In some cases, the feedback may trigger a re-evaluation of the API mappings or a re-scanning of certain application features to address the user's input.

By integrating user feedback, the system may continuously learn and adapt, potentially improving its accuracy and relevance over time. This collaborative approach between automated discovery and human expertise may result in more robust and user-centric action workflows.

In some cases, the user feedback mechanism may also serve as a quality assurance tool, helping to validate the system's outputs and ensure that the generated workflows align with user expectations and requirements. This iterative refinement process may contribute to the overall reliability and effectiveness of the automated action discovery system.

Figure 6:
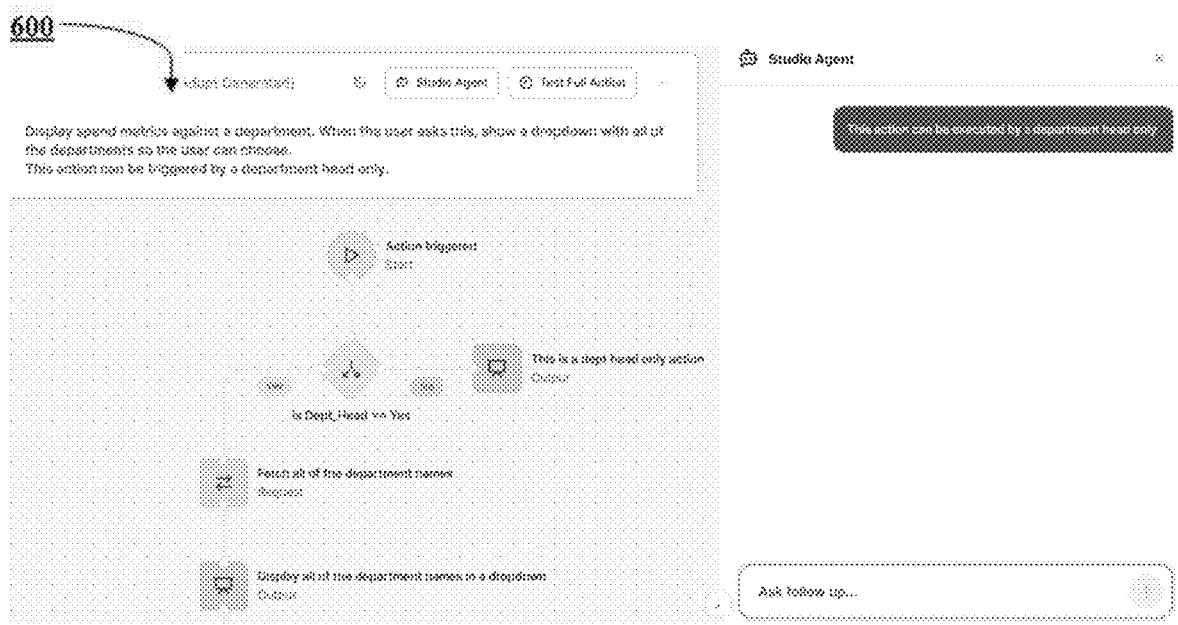
FIG. 6 is a diagram illustrating an example of User Interface depicting real-time updates to an action workflow based on user feedback, in accordance with an embodiment of the present subject matter.

Referring to FIG. 6, a user interface 600 shows real time updates to the action workflow based on the user's feedback. It may be noted that the system incorporates a mechanism for real-time updates to action workflows and definitions based on user feedback. This adaptive capability allows the system to continuously refine and improve its understanding of application actions and their corresponding API calls.

In some cases, when a user provides feedback on a generated action workflow, the system may immediately process this input and apply relevant changes. The feedback may include corrections to the workflow steps, suggestions for alternative API endpoints, or clarifications on the expected behavior of certain actions.

Upon receiving user feedback, the system may analyze the input using natural language processing techniques to extract actionable information. This analysis may involve identifying specific components of the workflow that require modification, understanding the context of the suggested changes, and determining the most appropriate way to implement these updates.

The system may then automatically adjust the action workflow based on the processed feedback. These adjustments may include reordering steps in the workflow, modifying API call parameters, or adding new steps to achieve the desired outcome more effectively.

In addition to updating the workflow itself, the system may also refine the action definition associated with the workflow. This refinement may involve updating the description of the action, modifying the categorization or tagging of the action, or adjusting the ranking of the action within the system's overall action set.

The real-time nature of these updates, as depicted in FIG. 6, may allow users to see the immediate impact of their feedback on the action workflow and definition. This immediate feedback loop may enhance the user experience and facilitate rapid iteration and improvement of the discovered actions.

In some cases, the system may employ machine learning algorithms to identify patterns in user feedback across multiple actions and workflows. These patterns may be used to inform broader improvements to the action discovery and mapping processes, potentially enhancing the accuracy and relevance of future automatically generated workflows.

The real-time update capability may also extend to the system's handling of API changes or application updates. When the system detects modifications to the underlying application or its APIs, it may automatically initiate a re-evaluation of affected action workflows and definitions, ensuring that they remain current and functional.

Figure 7:
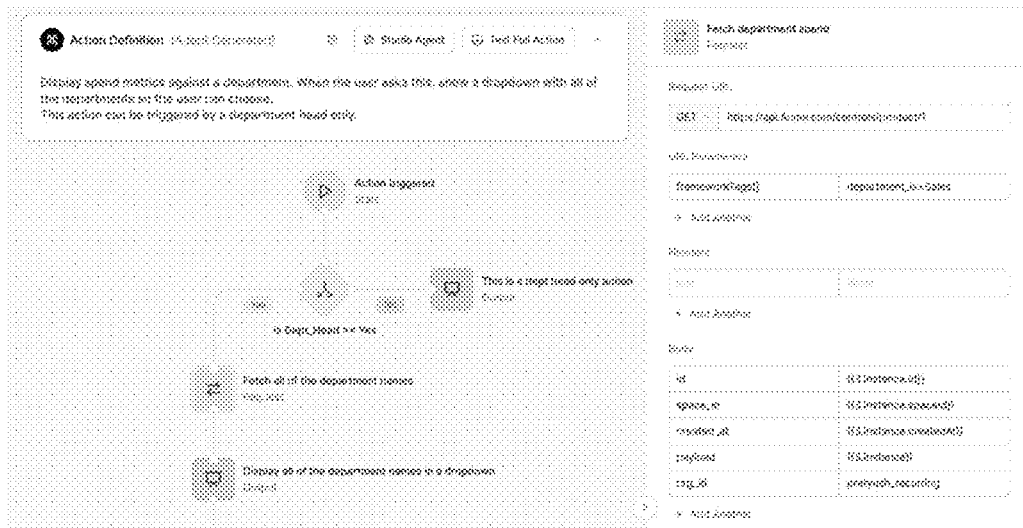
FIG. 7 is a diagram illustrating details of an API request structure, in accordance with an embodiment of the present subject matter.

FIG. 7 illustrates a user interface 700 which shows the system's capability to map and display key API details required to execute an action workflow. The interface allows the user to inspect the request URL, which is dynamically generated by the system based on the application's API structure. In this example, the system has mapped the GET request URL (https://api.Acme.com/controls/product/1) to fetch department-specific spend metrics. The system also automatically detects and associates URL parameters, such as frameworkTags[ ] and department_is=Sales, which help refine the API request to retrieve department-specific data.

Additionally, FIG. 7 shows that the system enables users to review the request body, which includes dynamically populated fields such as id, space_id, created_at, payload, and org_id. These values are automatically extracted from the application's data model, ensuring that each API request is correctly structured with the necessary information. The system also provides an option to inspect and modify header values, which may include authentication tokens, content types, or other required metadata for API requests.

By offering a detailed view of the request URL, parameters, headers, and body, the system allows users to verify, customize, and troubleshoot API interactions before execution. This feature enhances transparency and control, ensuring that the generated action workflows accurately align with the application's API framework.

Figure 8:
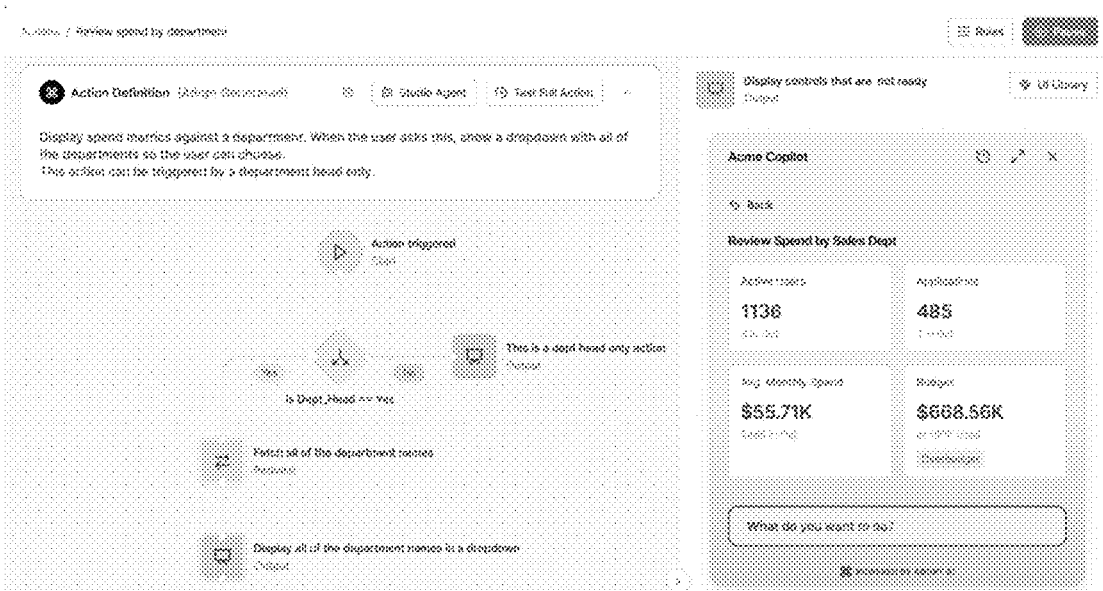
FIG. 8 is a diagram illustrating an example of User Interface depicting output display of metrics for a user query, in accordance with an embodiment of the present subject matter.

The system may present a final output to the user, as illustrated in FIG. 8, which displays various metrics related to the user's query on the user interface 800. In some cases, the output may include multiple data points relevant to the selected department or category.

In the example shown in FIG. 8, the system may display the average spend of the sales department. This metric may provide insights into the financial performance or resource allocation of the specific department selected by the user.

The output may also include information about active users. In some cases, this metric may represent the number of employees or team members currently engaged within the selected department or utilizing specific applications.

Additionally, the system may present data on the number of applications used. This information may offer visibility into the technological footprint or software utilization within the chosen department.

In some cases, the output may include budget information. This metric may provide context for the spending data, allowing users to compare actual expenditures against allocated resources.

The presentation of these metrics in a single, consolidated view may allow users to quickly assess multiple aspects of departmental performance or resource utilization. In some cases, this comprehensive display may facilitate data-driven decision-making by providing a holistic overview of key performance indicators.

The system may organize and present this information in a visually accessible format, potentially using graphical elements or color-coding to enhance readability and highlight important data points. In some cases, the layout and design of the output may be customizable to suit user preferences or specific organizational needs.

Figure 9:
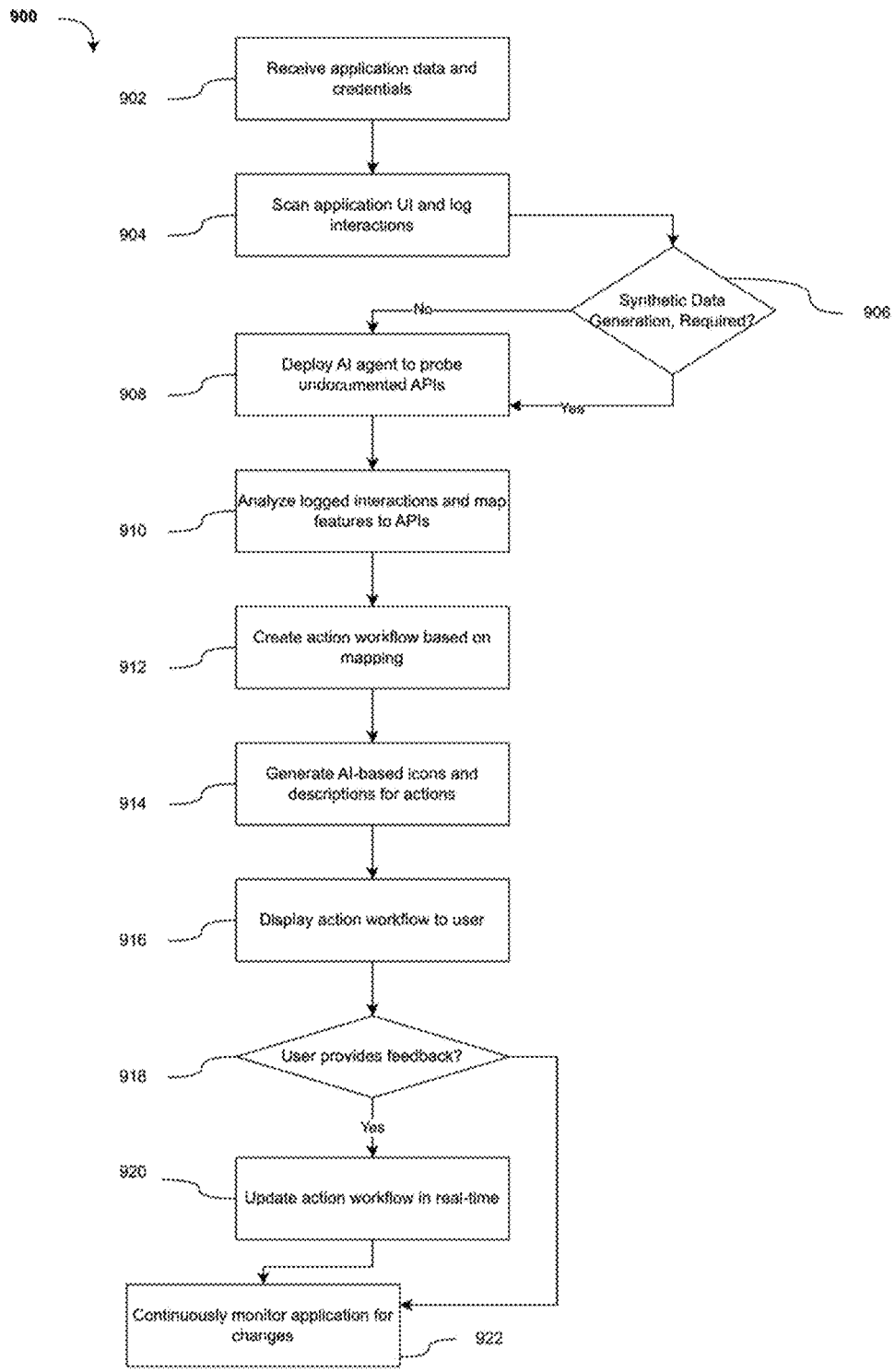
FIG. 9 is a flowchart illustrating a method for creating and updating action workflows.

The method for creating and updating action workflows, as illustrated in FIG. 9, involves a comprehensive process that begins with receiving application data and culminates in continuous monitoring for changes. This systematic approach ensures that the generated workflows remain accurate and up-to-date.

The method begins at step 900, where the system receives application data and credentials. This initial step may involve gathering various types of information, such as API documentation, user guides, or access tokens required to interact with the application.

In step 902, the system scans the application UI and logs interactions. This scanning process may involve automated traversal of the user interface, capturing user actions, and recording the corresponding system responses. The logged interactions may provide valuable insights into the application's structure and functionality.

Step 904 involves generating synthetic data for testing if needed. In some cases, the system may create artificial data inputs to explore different scenarios and uncover hidden features or edge cases within the application.

Following the data generation, in step 906, an AI agent may be deployed to probe undocumented APIs. This step may allow the system to discover API endpoints or functionalities that are not explicitly documented but are nonetheless accessible and potentially useful for workflow creation.

Step 908 involves analyzing logged interactions and mapping features to APIs. During this stage, the system may correlate user interface actions with the corresponding API calls, establishing a clear relationship between visible application features and their underlying implementation.

Based on the mapping from the previous step, the system creates an action workflow in step 910. This workflow may represent a series of steps or API calls required to accomplish a specific task within the application.

In step 912, the system generates AI-based icons and descriptions for actions. These visual and textual representations may help users better understand and interact with the created workflows.

The action workflow is then displayed to the user in step 914. This presentation may allow users to review and potentially interact with the generated workflow.

Step 916 introduces a decision point, checking if the user provides feedback on the displayed workflow. If feedback is provided, the process moves to step 918, where the action workflow may be updated in real-time based on the user's input. This immediate update capability may allow for quick refinement and improvement of the generated workflows.

Whether or not feedback is provided, the process continues to step 920, where the system continuously monitors the application for changes. In some cases, the creation timestamp may be used to trigger re-scanning of the application when a new version is detected. This ongoing monitoring may ensure that the action workflows remain current and aligned with any updates or modifications to the underlying application.

The method for creating and updating action workflows, as depicted in FIG. 9, represents a dynamic and adaptive approach to workflow generation and maintenance. By incorporating user feedback and continuous monitoring, the system may provide up-to-date and relevant action workflows that accurately reflect the current state and capabilities of the application.

Figure 10:
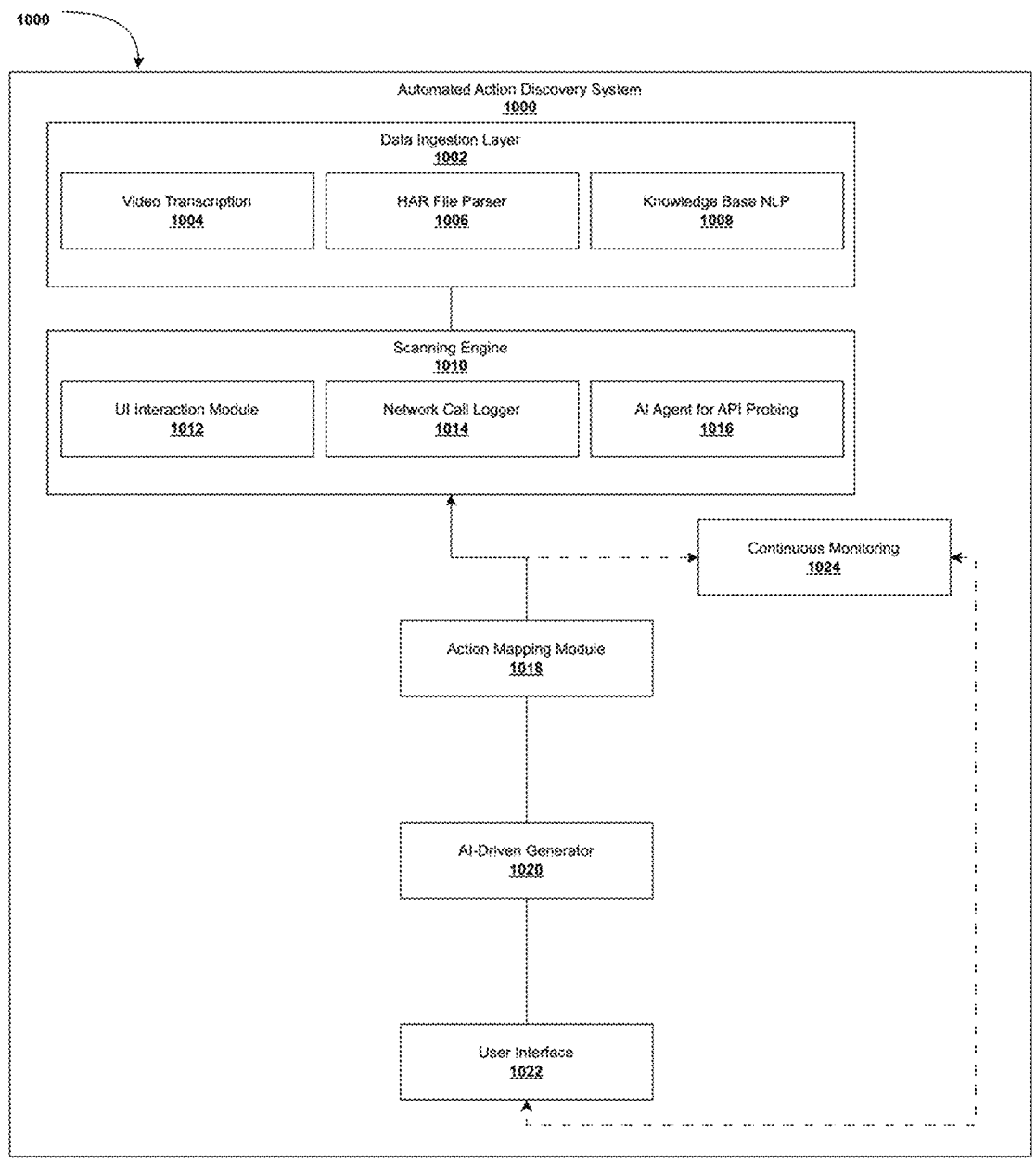
FIG. 10 is a system diagram illustrating components of an Automated Action Discovery System, in accordance with an embodiment of the present subject matter.

The Automated Action Discovery System 1000, as illustrated in FIG. 10, comprises a comprehensive architecture designed to analyze various data inputs and generate actions based on the discovered application capabilities. The system incorporates multiple interconnected components that work in concert to process, analyze, and interpret application data.

At the foundation of the system is the Data Ingestion Layer 1002, which serves as the entry point for various types of application-related data. This layer includes specialized subcomponents for handling different data formats. The Video Transcription component 1004 may process demo videos or tutorials, converting visual and audio content into text-based information that can be analyzed further. The HAR File Parsing component 1006 may extract and interpret HTTP Archive (HAR) files, which contain detailed records of web browser interactions with a web application. The Knowledge Base NLP component 1008 may employ natural language processing techniques to analyze and extract relevant information from textual knowledge bases or documentation.

Connected to the Data Ingestion Layer 1002 is the Scanning Engine 1010, which plays a crucial role in exploring and understanding the application's structure and behavior. The UI Interaction Module 1012 within the Scanning Engine may automate interactions with the application's user interface, simulating user actions to uncover various features and functionalities. The Network Call Logger 1014 may capture and record all network communications made during these interactions, providing insights into the underlying API calls and data exchanges. The AI Agent for API Probing 1016 may employ advanced techniques to discover and explore undocumented or hidden APIs, potentially revealing additional capabilities of the application.

The Action Mapping Module 1018 receives input from the Scanning Engine 1010 and may be responsible for correlating discovered features and API calls with specific actions or functionalities within the application. This module may analyze the relationships between user interface elements, network requests, and application behaviors to create a comprehensive map of available actions.

The AI-Driven Generator 1020 may utilize the mapped actions and other collected data to generate meaningful representations of the application's capabilities. In some cases, this component may create action descriptions, generate icons or visual representations for actions, or produce workflow recommendations based on the discovered features.

The User Interface 1022 may present the generated actions and related information to users in an accessible and interactive format. This interface may allow users to view, modify, or execute discovered actions, as well as provide feedback on the system's outputs.

The Continuous Monitoring component 1024 may maintain ongoing surveillance of the application, detecting changes or updates that may affect the discovered actions. This component may have bidirectional connections with both the Scanning Engine 1010 and the User Interface 1022, allowing it to initiate rescans when necessary and update the user interface with new or modified information.

In operation, the Automated Action Discovery System 1000 may begin by ingesting various forms of application data through the Data Ingestion Layer 1002. The Scanning Engine 1010 may then explore the application, capturing UI interactions and network calls while probing for hidden APIs. The Action Mapping Module 1018 may process this information to identify and categorize available actions within the application. The AI-Driven Generator 1020 may then create user-friendly representations of these actions, which are presented through the User Interface 1022. Throughout this process, the Continuous Monitoring component 1024 may ensure that the system remains up-to-date with any changes in the application.

By integrating these components, the Automated Action Discovery System 1000 may provide a comprehensive solution for uncovering, understanding, and presenting the full range of capabilities within an application, including those that may not be immediately apparent through conventional means.

Figure 11:
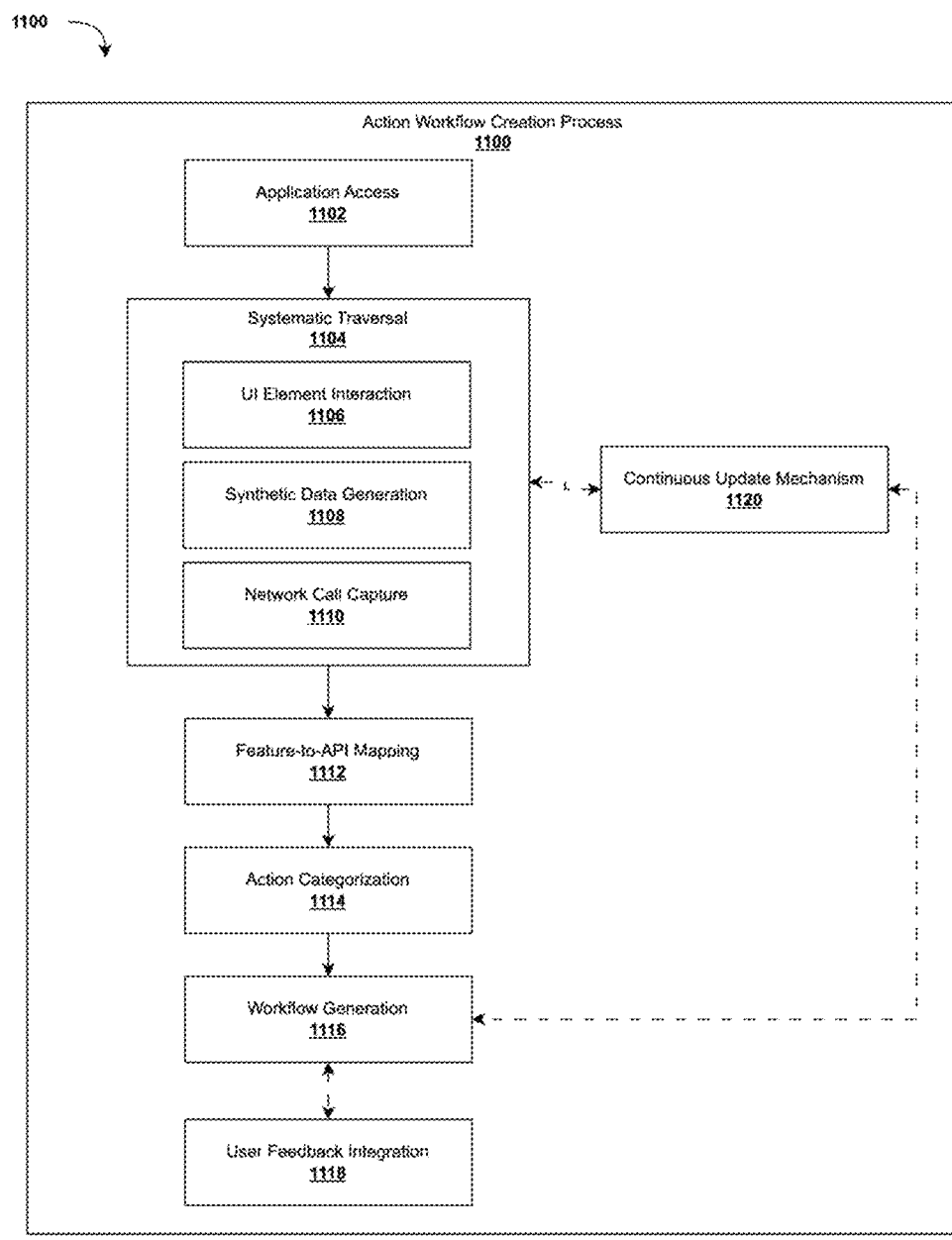
FIG. 11 is a system diagram illustrating components of an Action Workflow Creation Process, in accordance with an embodiment of the present subject matter.

The Action Workflow Creation Process 1100, as illustrated in FIG. 11, represents a comprehensive system for discovering, mapping, and generating actionable workflows within an application. This process employs a modular architecture that allows for systematic exploration of application features, mapping of these features to APIs, categorization of actions, and generation of workflows.

The process begins with the Application Access component 1102, which serves as the entry point for interacting with the target application. This component may handle authentication, establish necessary connections, and prepare the system for subsequent analysis.

Following application access, the Systematic Traversal component 1104 initiates a thorough exploration of the application. This component encompasses several sub-modules that work in concert to gather comprehensive data about the application's structure and behavior.

The UI Element Interaction sub-component 1106 may automate interactions with various user interface elements, simulating user actions to uncover different features and functionalities. In some cases, this may involve clicking buttons, filling forms, or navigating through menus.

Working alongside UI interaction, the Synthetic Data Generation sub-component 1108 may create artificial data inputs to test various scenarios within the application. This synthetic data may help explore edge cases or uncover hidden features that might not be apparent with standard inputs.

The Network Call Capture sub-component 1110 may record all API calls and network communications made during the systematic traversal. This captured data may provide valuable insights into the underlying structure of the application and its API endpoints.

Once the systematic traversal is complete, the Feature-to-API Mapping component 1112 may analyze the collected data to establish connections between user interface elements and their corresponding API calls. This mapping may form the foundation for understanding how different actions within the application relate to specific API endpoints.

The Action Categorization component 1114 may then organize the mapped features and APIs into logical groups or categories. In some cases, the space identifier may be used to categorize actions by domain topics or usage type. This categorization may help in creating a structured representation of the application's capabilities.

Using the categorized actions, the Workflow Generation component 1116 may create actionable workflows. These workflows may represent sequences of steps or API calls required to accomplish specific tasks within the application.

The User Feedback Integration component 1118 may allow for refinement of the generated workflows based on user input. This component may have a bidirectional connection with the Workflow Generation component 1116, enabling iterative improvements to the workflows based on real-world usage and user expertise.

The Continuous Update Mechanism 1120 may maintain ongoing connections with both the Systematic Traversal 1104 and Workflow Generation 1116 components. This mechanism may facilitate continuous improvements to the process by incorporating new discoveries from application scans or changes in workflow patterns.

The Action Workflow Creation Process 1100 employs a modular architecture that allows for flexibility and adaptability. Each component may operate independently while also working in concert with others to create a comprehensive understanding of the application and its actionable workflows. This modular approach may enable the system to adapt to different types of applications and evolve its capabilities over time.

In an embodiment, the system is implemented as a Software Development Kit (SDK) that can be seamlessly integrated into any third-party application for which the application workflow or action mapping needs to be determined. Once embedded, the SDK operates within the host application's runtime environment and initiates intelligent scanning and interaction routines to explore the application's features, user interface components, and underlying API structures. This enables the system to dynamically detect how various functionalities are triggered, what APIs are invoked during specific user interactions, and how different actions relate to each other across the application.

The SDK-based architecture offers a flexible and platform-agnostic solution, allowing it to be deployed across diverse software environments without requiring extensive customization. By integrating the SDK, developers and application owners can benefit from automatic action discovery, undocumented API inference, and structured documentation generation without modifying their core application logic. The SDK ensures continuous learning and real-time updates to reflect any changes in the application's behavior, thereby maintaining an up-to-date understanding of application workflows. This embedded deployment model enhances usability, reduces integration overhead, and supports scalable automation and feature mapping for complex enterprise-grade software systems.

The architecture of the SDK follows a modular, distributed design comprising three main components: the SDK embedded within the third-party application, the third-party application itself, and the SDK server. Once the SDK is integrated into the host application, it locally performs UI traversal, interaction logging, and network activity monitoring within the user's environment. This collected data—comprising UI elements, API calls, request-response pairs, and usage patterns—is then securely transmitted to the SDK server. The SDK server acts as a centralized processing hub where AI-based models analyze the data to infer undocumented APIs, generate action mappings, and construct structured specifications. The SDK server can then relay actionable insights, updated API mappings, and refined action definitions back to the SDK within the application, enabling near real-time synchronization. This architecture ensures that the system remains lightweight on the client side while leveraging centralized compute power and intelligence to continuously evolve with the application.

ML Architecture: Automated API Discovery and Workflow Generation

In an alternative embodiment, the system utilizes a Deep Learning-based model to automate API discovery, action workflow generation, and feature mapping within an application. This model is designed to process various data sources, extract relevant API interactions, and predict undocumented API behaviors using a combination of graph-based learning, attention mechanisms, and reinforcement learning techniques. The architecture follows a structured approach, starting with an input layer that collects data from multiple sources such as application UI elements, network traffic logs, clickstream data, recorded application workflows, and API documentation. These data sources are transformed into feature vectors that encode essential properties, including UI attributes, API interaction patterns, and system response behaviors, ensuring a comprehensive understanding of the application's API landscape.

Once the input data is processed, the system applies a graph-based message passing mechanism to capture the relationships between UI elements, user actions, and API calls. Each UI element or detected API endpoint is treated as a node, while edges represent interaction dependencies between them. The model extracts node features, such as UI component types, API request formats, workflow actions, and user behavior patterns, as well as edge features, including sequential API dependencies, request-response relationships, and error-handling pathways. This message-passing process enables the system to contextually link API interactions to UI components and workflow sequences, allowing for a structured representation of the application's API ecosystem.

To enhance API prediction and workflow mapping, the system employs a multi-head attention mechanism that prioritizes key API calls and interactions. The attention module analyzes patterns in API calls, UI interactions, and network responses, assigning attention weights based on API relevance, sequential impact, and feature-API mapping accuracy. This mechanism allows the system to focus on critical API endpoints while filtering out irrelevant or redundant interactions. For example, if a UI action frequently triggers an API call, the model assigns a higher attention weight to that interaction, ensuring that it is accurately mapped to application functionalities.

The processed data is then passed through hidden layers consisting of dense neural networks, where the model learns to predict undocumented APIs and generate optimized workflows. The architecture includes fully connected dense layers that progressively refine API predictions, with an initial layer of 128 neurons extracting high-level API interaction patterns, followed by a 64-neuron layer that captures hierarchical dependencies in user workflows, and a final 32-neuron layer that outputs refined API predictions and workflow recommendations. These layers work together to ensure that the system accurately maps newly discovered APIs to existing application functionalities while dynamically adjusting to changes in the application's behavior.

To improve the accuracy and efficiency of API discovery, the model incorporates reinforcement learning, where each successful API discovery and workflow prediction is rewarded, while incorrect predictions receive penalties. This iterative learning process allows the model to continuously refine its approach and improve its accuracy over time. The training process utilizes a batch size of 64, a learning rate of 0.0005, a dropout rate of 0.2 to prevent overfitting, and the Adam optimizer for adaptive learning. The reinforcement learning mechanism assigns positive rewards for successful API predictions and workflow mappings, ensuring that the model learns from both correct and incorrect attempts to optimize future discoveries.

The output layer of the model provides undocumented API predictions, generated action workflows, feature-API mappings, confidence scores, and anomaly detection flags. The system can automatically identify undocumented API endpoints by analyzing patterns from existing APIs, generate structured workflow recommendations, and ensure API mappings align with application functionalities. Additionally, the model detects anomalies and potential security risks in undocumented APIs, allowing developers to proactively address vulnerabilities and ensure compliance. By leveraging deep learning, attention-based message passing, and reinforcement learning, the system streamlines the process of API discovery, documentation, and workflow automation, significantly reducing manual effort while enhancing the adaptability and intelligence of the API ecosystem.

In an embodiment, the system performs continuous scanning of the application, even in the absence of version changes or feature updates, to ensure that its API mapping and data structures remain up to date. This is essential because, after deploying the system (as an SDK), end users interact with the application alongside the system, requiring real-time updates for every data point. Given that different APIs within the application have varying data structures, dependencies, and functional relationships, the system employs multiple scanning techniques tailored to each API type. As the system repeatedly scans the application, it develops an Adaptive Processing Engine that learns how APIs are interconnected, enabling optimized scanning strategies. For instance, if an application contains ten APIs (API 1 to API 10), and APIs 1 and 2 share common actions, while APIs 9 and 10 are interdependent, the system intelligently distributes worker nodes to scan them in parallel. One worker node may handle APIs 1 and 2, while another handles APIs 9 and 10, ensuring efficient scanning by leveraging API dependencies and linked actions. This adaptive allocation of scanning resources not only reduces processing time but also enhances the system's ability to dynamically update API mappings and execute commands efficiently in response to user interactions.

The Adaptive Processing Engine of the system serves as an AI-driven orchestration engine that dynamically determines how to scan, categorize, and optimize API interactions based on observed patterns, dependencies, and historical data. Unlike traditional static rule-based systems, the Adaptive Processing Engine continuously learns from past scans to enhance efficiency and accuracy in API discovery and mapping. The system initially scans the application to identify all available APIs, including both documented and undocumented APIs, and records API request-response structures, parameter dependencies, and invocation sequences. By analyzing this data, the system determines which APIs share common data fields, trigger related actions, or follow sequential execution patterns. For instance, if API 1 and API 2 return similar action responses, the system infers a functional link between them, whereas if API 9 must be executed before API 10 to retrieve complete data, the system registers them as an interdependent API pair.

Based on the identified API relationships, the Adaptive Processing Engine applies machine learning models, including clustering algorithms and reinforcement learning, to categorize APIs into execution clusters based on their dependencies, data overlap, and invocation behavior. If API 1 and API 2 consistently yield related results, while API 9 and API 10 always execute sequentially, the system groups them into distinct scanning clusters. Using this analysis, the system dynamically allocates worker nodes to execute scanning operations in an optimized manner. The Adaptive Processing Engine deploys worker nodes in parallel for APIs that can be processed simultaneously, while ensuring sequential execution for APIs with interdependencies. For example, a dedicated worker node may be assigned to API 1 and API 2, while a separate worker node handles API 9 and API 10 to maintain execution integrity while improving scanning speed.

The Adaptive Processing Engine further monitors the scanning process in real time and continuously adjusts execution strategies to optimize system performance. If a specific API cluster results in errors, inefficiencies, or redundant data, the system reconfigures the scanning order, modifies API request parameters, or reallocates computational resources to improve efficiency. Over time, the Adaptive Processing Engine self-optimizes to predict which APIs should be scanned together or separately, reducing computational overhead and ensuring efficient API discovery. Additionally, as application updates occur, the system automatically relearns API relationships and adapts its scanning techniques without requiring manual intervention.

By dynamically adapting to application changes, the Adaptive Processing Engine enables the system to maintain an up-to-date, highly efficient API discovery process. This approach minimizes redundant computations, accelerates scanning operations, and ensures the accuracy of API mappings, thereby enhancing automation, integration, and overall system performance.

Exemplary embodiments discussed above may provide certain advantages. Though not required to practice aspects of the disclosure, these advantages may include those provided by the following features.

Some embodiments of the system and the method enable automated discovery of undocumented APIs by systematically scanning application interactions, thereby reducing the manual effort required for API documentation and integration.

Some embodiments of the system and the method enable intelligent mapping of UI elements to backend APIs, ensuring accurate workflow generation and seamless automation of application functionalities.

Some embodiments of the system and the method enable the use of graph-based message passing and attention mechanisms to analyze API relationships, improving API prediction accuracy and optimizing workflow execution.

Some embodiments of the system and the method enable continuous monitoring of applications, automatically detecting API changes and updating workflows in real time, thereby ensuring adaptability to evolving software versions.

Some embodiments of the system and the method enable reinforcement learning-based optimization, where successful API discoveries and workflow predictions improve future recommendations, leading to a more efficient and intelligent system over time.

Some embodiments of the system and the method enable dynamic visualization of API dependencies and workflows, allowing users to inspect API interactions, modify request parameters, and validate execution before implementation.

Some embodiments of the system and the method enable the identification of security vulnerabilities and anomalies in undocumented APIs, ensuring compliance with best security practices and reducing risks associated with hidden API endpoints.

Some embodiments of the system and the method enable improved decision-making for software engineers and business users by providing confidence scores for API predictions, ranking workflow actions, and generating actionable insights based on real-world data interactions.

A number of implementations have been described. Nevertheless, it will be understood that various modifications may be made without departing from the spirit and scope of the disclosure. Accordingly, other implementations are within the scope of the following claims.

The invention claimed is:

1. A computer-implemented method for automatically generating an action workflow for an application, the method comprising:
   receiving, by a processor, application data comprising one or more of demo videos, clickstream data, a knowledge base, an application workflow database, tickets, website information, or hypertext transfer protocol archive (HAR) files;
   scanning, by the processor, the application by interacting with user interface (UI) elements, logging interactions, and detecting a plurality of application programming interfaces (APIs);
   identifying, by the processor, a set of undocumented APIs accessible through backend communications by deploying an artificial intelligence (AI) agent configured to perform at least one of analyzing network traffic, detecting undocumented request patterns, comparing API call sequences, and inferring undocumented API structures based on API request-response pairs, network activity, and UI-triggered interactions, wherein the AI agent comprises a machine learning model comprising an attention mechanism prioritizing API calls and interactions by assigning attention weights based on API relevance, sequential impact, and feature-API mapping accuracy, and a plurality of fully connected layers progressively refining API predictions, wherein the plurality of fully connected layers comprise an initial layer of neurons extracting API interaction patterns, a second layer of neurons capturing hierarchical dependencies in workflows, and a final layer of neurons outputting refined API predictions and workflow recommendations;
   generating, by the processor, one or more action workflows, wherein an action workflow maps one or more APIs to an action associated with the application, wherein the one or more APIs are mapped from the plurality of APIs and the set of undocumented APIs;
   displaying, via a graphical user interface, the action workflow along with an action definition, modifying, simulating, and testing API-driven actions; and
   refining, by the AI agent, API specifications and predicting expected functionalities by comparing the set of undocumented APIs with existing API documentation, developer forums, and application knowledge bases by detecting missing or inferred parameters, evaluating authentication mechanisms, and cross-referencing observed API behavior with external documentation.

2. The computer-implemented method of claim 1, wherein the AI agent applies Retrieval Augmented Generation (RAG) to extract parameter descriptions, request-response relationships, and authentication requirements from external documentation sources and inferred, and applies pointer-based prompt engineering to refine inferences based on contextual API usage patterns.

3. The computer-implemented method of claim 1, wherein the AI agent employs context-driven API inference to determine undocumented API functionality based on a user interface context, associated feature usage, and API invocation sequences.

4. The computer-implemented method of claim 1, wherein the machine learning model assigns confidence scores to inferred API mappings based on API response consistency, request pattern validation, and external documentation cross-referencing.

5. The computer-implemented method of claim 1, wherein a Large Language Model (LLM) is utilized to generate the action definition and an associated action icon.

6. The computer-implemented method of claim 1, further comprising updating, in real time, the one or more action workflows and the action definition based on user input, wherein the user input comprises at least one of a textual prompt or a drag-and-drop modification of an action icon on the graphical user interface.

7. The computer-implemented method of claim 1, further comprising constructing an API specification for the undocumented APIs comprising inferred field descriptions, supported request methods, expected response codes, and security requirements.

8. The computer-implemented method of claim 1, wherein the action workflow categorizes actions based on type, usage frequency, and topic.

9. The computer-implemented method of claim 1, further comprising synthetic data generation for generating structured test cases to trigger API responses, regenerating valuesupon detecting anomalies, and modifying or deleting entries to infer API dependencies.

10. The computer-implemented method of claim 9, wherein the synthetic data generation utilizes fuzzing techniques to inject structured and unstructured data into API request parameters to analyze undocumented API behavior and error responses.

11. The computer-implemented method of claim 1, further comprising reinitiating the scanning of the application in response to detecting at least one of an error during scanning, a change in a version of the application, or an application coverage level falling below a predefined threshold.

12. The computer-implemented method of claim 1, further comprising determining, based on API dependency graphs and processing workload analysis, whether to perform sequential or parallel scanning of the application and dynamically allocating scanning agents or distributed worker nodes to optimize scanning efficiency.

13. The computer-implemented method of claim 1, further comprising continuously monitoring the application to detect modifications in the one or more APIs, updating API mappings and the action workflows in real time based on detected changes.

14. A system for automatically generating an action workflow for an application, the system comprising:
a memory storing instructions; and
a processor coupled to the memory, wherein the processor is configured to execute the instructions for:
receiving application data comprising one or more of demo videos, clickstream data, a knowledge base, an application workflow database, tickets, website information, or hypertext transfer protocol archive (HAR) files;
scanning the application by interacting with user interface (UI) elements, logging interactions, and detecting a plurality of application programming interfaces (APIs);
identifying a set of undocumented APIs accessible through backend communications by deploying an artificial intelligence (AI) agent configured to perform at least one of analyzing network traffic, detecting undocumented request patterns, comparing API call sequences, and inferring undocumented API structures based on API request-response pairs, network activity, and UI-triggered interactions, wherein the AI agent comprises a machine learning model comprising an attention mechanism prioritizing API calls and interactions by assigning attention weights based on API relevance, sequential impact, and feature-API mapping accuracy, and a plurality of fully connected layers progressively refining API predictions, wherein the plurality of fully connected layers comprise an initial layer of neurons extracting API interaction patterns, a second layer of neurons capturing hierarchical dependencies in workflows, and a final layer of neurons outputting refined API predictions and workflow recommendations;
generating one or more action workflows, wherein an action workflow maps one or more APIs to an action associated with the application, wherein the one or more APIs are mapped from the plurality of APIs and the set of undocumented APIs;
displaying, via a graphical user interface, the action workflow along with an action definition, modifying, simulating, and testing API-driven actions; and
refining, by the AI agent, API specifications and predicting expected functionalities by comparing the set of undocumented APIs with existing API documentation, developer forums, and application knowledge bases by detecting missing or inferred parameters, evaluating authentication mechanisms, and cross-referencing observed API behavior with external documentation.

15. The system of claim 14, wherein the AI agent applies Retrieval Augmented Generation (RAG) to extract parameter descriptions, request-response relationships, and authentication requirements from external documentation sources and inferred, and applies pointer-based prompt engineering to refine inferences based on contextual API usage patterns.

16. The system of claim 14, wherein the AI agent employs context-driven API inference to determine undocumented API functionality based on a user interface context, associated feature usage, and API invocation sequences.

17. The system of claim 14, wherein the machine learning model assigns confidence scores to inferred API mappings based on API response consistency, request pattern validation, and external documentation cross-referencing.

18. The system of claim 14, wherein a Large Language Model (LLM) is utilized to generate the action definition and an associated action icon.

\* \* \* \* \*